(12) United States Patent
Pinkus et al.

(10) Patent No.: US 9,037,852 B2
(45) Date of Patent: May 19, 2015

(54) SYSTEM AND METHOD FOR INDEPENDENT CONTROL OF FOR-HIRE VEHICLES

(75) Inventors: Michael Collins Pinkus, Alpharetta, GA (US); Mark A. James, Las Vegas, NV (US); James Alan Wisniewski, Las Vegas, NV (US)

(73) Assignee: IVSC IP LLC, Las Vegas, NV (US)

( * ) Notice: Subject to any disclaimer, the term of this patent is extended or adjusted under 35 U.S.C. 154(b) by 78 days.

(21) Appl. No.: 13/225,360

(22) Filed: Sep. 2, 2011

(65) Prior Publication Data

US 2013/0061044 A1    Mar. 7, 2013

(51) Int. Cl.
| | |
|---|---|
| G06F 21/00 | (2013.01) |
| G07B 13/00 | (2006.01) |
| H04L 29/08 | (2006.01) |
| G07B 15/00 | (2011.01) |
| G07C 5/08 | (2006.01) |

(52) U.S. Cl.
CPC ............... *G07B 13/00* (2013.01); *H04L 67/12* (2013.01); *G07B 15/00* (2013.01); *G07C 5/085* (2013.01)

(58) Field of Classification Search
CPC ........ G07B 13/00; G07B 15/00; G07C 5/085; H04L 67/12
USPC .......................... 713/150–182, 189, 192, 193
See application file for complete search history.

(56) References Cited

U.S. PATENT DOCUMENTS

| | | | |
|---|---|---|---|
| 3,589,486 A | 6/1971 | Kelch | |
| 3,667,307 A | 6/1972 | Kelch | |
| 3,675,504 A | 7/1972 | Schuh | |
| 3,698,627 A | 10/1972 | Kelch et al. | |
| 3,736,408 A | 5/1973 | Kienzle et al. | |
| 3,764,782 A | 10/1973 | Spauszus et al. | |

(Continued)

FOREIGN PATENT DOCUMENTS

| | | |
|---|---|---|
| CN | 101488784 | 7/2009 |
| DE | 36 36 353 C1 | 11/1987 |

(Continued)

OTHER PUBLICATIONS

NPL: Premier Cabs MTDATA Handbook by Mobile Tracking and Data Pty. Ltd., Dec. 2009.*
"Another Look at Xtify", available at http //www.locationawhere.com/24/06/2010/companies/xtify, on Sep. 1, 2011, 6 pages.
Cassias et al., "Vehicle Telematics: A Literature Review", Technical Report <http://www.catlab.sr.unh.edu/Reference/Download.pm/2691/Document.
PDFAbstract:Vehicletelematicsistheuseofcomputing>, Oct. 30, 2007.

(Continued)

*Primary Examiner* — Chau Le
*Assistant Examiner* — Don Zhao
(74) *Attorney, Agent, or Firm* — Knobbe, Martens, Olson & Bear LLP

(57) ABSTRACT

A computer system storing parameters pertaining to the regulatory restrictions placed on a for-hire vehicle compares the parameters to a current operating environment of the for-hire vehicle. In some embodiments, the computer system acts as the meter (such as a taximeter) of the for-hire vehicle. The operating parameters may include expiration or exclusion parameters that define the scope of operation of the for-hire vehicle stemming from the for-hire vehicle's medallion or certificate of public convenience and necessity. The expiration or exclusion parameters may also correspond to a driver's permit or any general regulation enacted by the regulatory agency. If the current operating environment does not comply with the expiration or exclusion parameters, the computer system shuts down, or enters a standby mode, and may not accept additional passenger fares until the current operating environment complies with the expiration and exclusion parameters.

36 Claims, 9 Drawing Sheets

(56) References Cited

U.S. PATENT DOCUMENTS

| | | | |
|---|---|---|---|
| 3,809,312 | A | 5/1974 | Warrick et al. |
| 3,860,806 | A | 1/1975 | Fichter et al. |
| 3,860,807 | A | 1/1975 | Fichter et al. |
| 3,931,508 | A | 1/1976 | Kelch |
| 3,937,933 | A | 2/1976 | Warkentin |
| 3,946,213 | A | 3/1976 | Kepper |
| 3,953,720 | A | 4/1976 | Kelch |
| 4,001,560 | A | 1/1977 | Larsen |
| 4,021,645 | A | 5/1977 | Saufferer et al. |
| 4,024,384 | A | 5/1977 | Tateishi et al. |
| 4,039,780 | A | 8/1977 | Kelch et al. |
| 4,045,656 | A | 8/1977 | Scott |
| 4,056,709 | A | 11/1977 | Scholl et al. |
| 4,081,663 | A | 3/1978 | Ahlberg |
| 4,095,737 | A | 6/1978 | Schuh et al. |
| 4,118,775 | A | 10/1978 | Boyce |
| 4,160,155 | A | 7/1979 | Steele et al. |
| 4,167,040 | A | 9/1979 | Heritier et al. |
| 4,205,388 | A | 5/1980 | Steiner |
| 4,208,664 | A | 6/1980 | Mattori |
| 4,209,688 | A | 6/1980 | Kelch |
| 4,212,069 | A | 7/1980 | Baumann |
| 4,217,484 | A | 8/1980 | Gerst |
| 4,240,146 | A | 12/1980 | Iles |
| 4,280,180 | A | 7/1981 | Eckert et al. |
| 4,389,563 | A | 6/1983 | Ricard |
| 4,409,685 | A | 10/1983 | Ricard |
| 4,482,965 | A | 11/1984 | Tateishi et al. |
| 4,539,644 | A | 9/1985 | Adams et al. |
| 4,570,228 | A | 2/1986 | Ahlberg |
| 4,574,189 | A | 3/1986 | Adams et al. |
| 4,578,760 | A | 3/1986 | Adams et al. |
| 4,580,039 | A | 4/1986 | Adams |
| 4,740,900 | A | 4/1988 | Adams |
| 4,789,774 | A | 12/1988 | Koch et al. |
| 4,860,124 | A | 8/1989 | Adams |
| 4,998,205 | A | 3/1991 | Ricard |
| 5,008,827 | A | 4/1991 | Sansone et al. |
| 5,043,562 | A | 8/1991 | Hautvast et al. |
| 5,121,097 | A | 6/1992 | van Zeggeren |
| 5,155,747 | A | 10/1992 | Huang |
| 5,187,646 | A | 2/1993 | Koch |
| 5,241,594 | A | 8/1993 | Kung |
| 5,274,561 | A | 12/1993 | Adams et al. |
| 5,303,163 | A | 4/1994 | Ebaugh et al. |
| 5,319,613 | A | 6/1994 | Adams |
| 5,428,555 | A | 6/1995 | Starkey et al. |
| 5,623,136 | A | 4/1997 | Schmid et al. |
| 5,629,856 | A | 5/1997 | Ricard |
| 5,646,387 | A | 7/1997 | Schmid et al. |
| 5,809,234 | A | 9/1998 | Le Van Suu |
| 5,828,738 | A | 10/1998 | Spaeth |
| 5,897,626 | A | 4/1999 | Pomerantz |
| 5,917,434 | A | 6/1999 | Murphy |
| 5,924,057 | A | 7/1999 | Kell |
| 6,081,204 | A | 6/2000 | Lavoie et al. |
| 6,087,965 | A | 7/2000 | Murphy |
| 6,109,520 | A | 8/2000 | Ricard |
| 6,122,591 | A | 9/2000 | Pomerantz |
| 6,246,933 | B1 | 6/2001 | Bague |
| 6,253,129 | B1 | 6/2001 | Jenkins et al. |
| 6,275,768 | B1 | 8/2001 | Zobell et al. |
| 6,339,745 | B1 * | 1/2002 | Novik ........................... 701/431 |
| 6,456,207 | B1 | 9/2002 | Yen |
| 6,466,921 | B1 | 10/2002 | Cordery et al. |
| 6,474,552 | B1 | 11/2002 | Ricard |
| 6,487,717 | B1 | 11/2002 | Brunemann et al. |
| 6,546,006 | B1 | 4/2003 | Fraser |
| 6,611,755 | B1 | 8/2003 | Coffee et al. |
| 6,686,834 | B1 | 2/2004 | Tamam et al. |
| 6,756,913 | B1 | 6/2004 | Ayed |
| 6,772,331 | B1 | 8/2004 | Hind et al. |
| 6,782,241 | B2 | 8/2004 | Kobayashi |
| 6,839,840 | B1 | 1/2005 | Cooreman |
| 6,931,309 | B2 | 8/2005 | Phelan et al. |
| 6,941,197 | B1 | 9/2005 | Murakami et al. |
| 7,085,775 | B2 | 8/2006 | Short, III et al. |
| 7,100,195 | B1 | 8/2006 | Underwood |
| 7,130,584 | B2 | 10/2006 | Hirvonen |
| 7,163,459 | B2 | 1/2007 | Tanskanen |
| 7,278,031 | B1 | 10/2007 | Best |
| 7,472,172 | B2 | 12/2008 | Anderson et al. |
| 7,551,593 | B2 | 6/2009 | Haller et al. |
| 7,565,529 | B2 | 7/2009 | Beck et al. |
| 7,598,889 | B2 | 10/2009 | Maeda et al. |
| 7,693,662 | B2 | 4/2010 | Yamada |
| 7,721,108 | B2 | 5/2010 | Pailles et al. |
| 7,738,569 | B2 | 6/2010 | Quinn et al. |
| 7,797,679 | B2 | 9/2010 | Tysowski et al. |
| 7,811,172 | B2 | 10/2010 | Asher et al. |
| 7,812,711 | B2 | 10/2010 | Brown et al. |
| 7,813,715 | B2 | 10/2010 | McKillop et al. |
| 7,817,991 | B2 | 10/2010 | Hinckley et al. |
| 7,904,063 | B1 | 3/2011 | Steelberg et al. |
| 7,907,901 | B1 | 3/2011 | Kahn et al. |
| 7,912,020 | B2 | 3/2011 | Khasawneh et al. |
| 7,913,297 | B2 | 3/2011 | Wyld |
| 7,932,892 | B2 | 4/2011 | Chen et al. |
| 7,941,831 | B2 | 5/2011 | Mandhana et al. |
| 8,243,423 | B2 | 8/2012 | Ranta et al. |
| 2002/0049683 | A1 | 4/2002 | Ricard |
| 2002/0052751 | A1 | 5/2002 | Ebata |
| 2002/0072963 | A1 | 6/2002 | Jonge |
| 2002/0120590 | A1 | 8/2002 | Richard |
| 2002/0186144 | A1 * | 12/2002 | Meunier ................... 340/825.28 |
| 2003/0022719 | A1 | 1/2003 | Donald et al. |
| 2003/0032460 | A1 | 2/2003 | Cannon et al. |
| 2003/0034873 | A1 | 2/2003 | Chase et al. |
| 2003/0037237 | A1 | 2/2003 | Abgrall et al. |
| 2003/0068999 | A1 | 4/2003 | Casali et al. |
| 2003/0079122 | A1 | 4/2003 | Asokan et al. |
| 2003/0139941 | A1 | 7/2003 | Matsumoto |
| 2003/0177020 | A1 | 9/2003 | Okamura |
| 2003/0177373 | A1 | 9/2003 | Moyer et al. |
| 2003/0217270 | A1 | 11/2003 | Nakayama |
| 2004/0078118 | A1 * | 4/2004 | Binder ............................. 701/1 |
| 2004/0093312 | A1 | 5/2004 | Cordery et al. |
| 2004/0112959 | A1 | 6/2004 | Jun |
| 2004/0143378 | A1 | 7/2004 | Vogelsang |
| 2004/0210757 | A1 * | 10/2004 | Kogan et al. ................... 713/182 |
| 2004/0225440 | A1 * | 11/2004 | Khatwa et al. ................ 701/301 |
| 2004/0253923 | A1 | 12/2004 | Braley et al. |
| 2006/0033840 | A1 | 2/2006 | Diehl et al. |
| 2006/0143455 | A1 | 6/2006 | Gitzinger |
| 2006/0182055 | A1 * | 8/2006 | Coffee et al. .................. 370/328 |
| 2006/0200430 | A1 | 9/2006 | Kim |
| 2006/0206433 | A1 | 9/2006 | Scoggins |
| 2006/0259790 | A1 | 11/2006 | Asokan et al. |
| 2006/0267860 | A1 | 11/2006 | Rinaldo et al. |
| 2006/0282649 | A1 | 12/2006 | Malamud et al. |
| 2007/0032195 | A1 | 2/2007 | Kurisko et al. |
| 2007/0082614 | A1 | 4/2007 | Mock |
| 2007/0109106 | A1 | 5/2007 | Maeda et al. |
| 2007/0123166 | A1 | 5/2007 | Sheynman et al. |
| 2007/0179910 | A1 | 8/2007 | Ferraro |
| 2007/0208864 | A1 | 9/2007 | Flynn et al. |
| 2008/0040210 | A1 | 2/2008 | Hedley |
| 2008/0057868 | A1 | 3/2008 | Chang |
| 2008/0102793 | A1 | 5/2008 | De Leon et al. |
| 2008/0113618 | A1 | 5/2008 | De Leon et al. |
| 2008/0114707 | A1 | 5/2008 | Steiner |
| 2008/0126665 | A1 | 5/2008 | Burr et al. |
| 2008/0147268 | A1 | 6/2008 | Fuller |
| 2008/0166968 | A1 | 7/2008 | Tang et al. |
| 2008/0248748 | A1 | 10/2008 | Sangster et al. |
| 2008/0285626 | A1 | 11/2008 | Claus et al. |
| 2008/0287062 | A1 | 11/2008 | Claus et al. |
| 2008/0294312 | A1 | 11/2008 | O'Connor et al. |
| 2008/0319604 | A1 | 12/2008 | Follmer et al. |
| 2009/0024419 | A1 | 1/2009 | McClellan et al. |
| 2009/0030885 | A1 | 1/2009 | DePasquale et al. |
| 2009/0034591 | A1 | 2/2009 | Julian et al. |
| 2009/0061769 | A1 | 3/2009 | Zimbric et al. |
| 2009/0083833 | A1 | 3/2009 | Ziola et al. |

(56) References Cited

U.S. PATENT DOCUMENTS

| | | |
|---|---|---|
| 2009/0096573 A1 | 4/2009 | Graessley |
| 2009/0098855 A1 | 4/2009 | Fernandez et al. |
| 2009/0111378 A1 | 4/2009 | Sheynman et al. |
| 2009/0156123 A1 | 6/2009 | Kim |
| 2009/0156241 A1 | 6/2009 | Staffaroni et al. |
| 2009/0157255 A1 | 6/2009 | Plante |
| 2009/0169006 A1 | 7/2009 | Zick et al. |
| 2009/0186577 A1 | 7/2009 | Ross et al. |
| 2009/0207014 A1 | 8/2009 | Ayed |
| 2009/0254259 A1 | 10/2009 | The |
| 2009/0254270 A1 | 10/2009 | Yu |
| 2009/0270036 A1 | 10/2009 | Michaud |
| 2009/0286479 A1 | 11/2009 | Thoresson et al. |
| 2009/0325491 A1 | 12/2009 | Bell et al. |
| 2009/0326991 A1 | 12/2009 | Wei et al. |
| 2010/0022217 A1 | 1/2010 | Ketari |
| 2010/0027414 A1 | 2/2010 | Hamachi |
| 2010/0045452 A1 | 2/2010 | Periwal |
| 2010/0077115 A1 | 3/2010 | Rofougaran |
| 2010/0094780 A1 | 4/2010 | Trzcinski |
| 2010/0167643 A1 | 7/2010 | Hirsch |
| 2010/0167646 A1 | 7/2010 | Alameh et al. |
| 2010/0194549 A1 | 8/2010 | Tonokawa et al. |
| 2010/0227549 A1 | 9/2010 | Kozlay |
| 2010/0241857 A1 | 9/2010 | Okude et al. |
| 2010/0246824 A1 | 9/2010 | Xiao et al. |
| 2010/0250060 A1 | 9/2010 | Maeda et al. |
| 2010/0255782 A1 | 10/2010 | Klemmensen |
| 2010/0265034 A1 | 10/2010 | Cap et al. |
| 2010/0318578 A1 | 12/2010 | Treu et al. |
| 2010/0330908 A1 | 12/2010 | Maddern et al. |
| 2011/0022764 A1 | 1/2011 | Ohkubo et al. |
| 2011/0077056 A1 | 3/2011 | Park et al. |
| 2011/0119491 A1 | 5/2011 | Nocera |
| 2011/0124321 A1 | 5/2011 | Sagong et al. |
| 2012/0041675 A1 | 2/2012 | Juliver et al. |
| 2012/0137126 A1 | 5/2012 | Matsuoka et al. |
| 2012/0172136 A1 | 7/2012 | House et al. |
| 2012/0185302 A1 | 7/2012 | Kim et al. |
| 2012/0303533 A1 | 11/2012 | Pinkus et al. |
| 2013/0006722 A1 | 1/2013 | Ziomkowski et al. |
| 2013/0060721 A1 | 3/2013 | Pinkus et al. |
| 2013/0061044 A1 | 3/2013 | Pinkus et al. |
| 2013/0066688 A1 | 3/2013 | Pinkus et al. |
| 2013/0104220 A1 | 4/2013 | Lee |

FOREIGN PATENT DOCUMENTS

| | | |
|---|---|---|
| DE | 37 36 258 | 5/1989 |
| DE | 39 22 373 | 1/1991 |
| DE | 10 120 781 C2 | 5/2003 |
| DE | 10 2005 052 872 | 7/2007 |
| DE | 20 2008 005 583 U1 | 8/2008 |
| EP | 0 261 433 A2 | 3/1988 |
| EP | 0 406 663 A3 | 11/1992 |
| EP | 0 265 708 B1 | 1/1993 |
| EP | 0 313 882 B1 | 2/1993 |
| EP | 0 600 818 | 6/1994 |
| EP | 1 455 487 | 9/2004 |
| EP | 1 358 748 B1 | 10/2006 |
| EP | 1 887 770 | 2/2008 |
| EP | 1 975 899 | 10/2008 |
| EP | 2 073 160 | 6/2009 |
| KR | 1995-0014892 B1 | 12/1995 |
| KR | 2007-0075874 | 7/2007 |
| KR | 863420 B1 | 10/2008 |
| KR | 2009-0047144 | 5/2009 |
| KR | 2009-0081136 | 7/2009 |
| WO | WO 02/102019 A2 | 12/2002 |
| WO | WO 2007/118221 A2 | 10/2007 |
| WO | WO 2008/082779 | 7/2008 |
| WO | WO 2009/129957 | 10/2009 |
| WO | WO 2011/038269 | 3/2011 |
| WO | WO 2011/056044 A2 | 5/2011 |
| WO | WO 2012/162100 | 11/2012 |
| WO | WO 2013/033468 | 3/2013 |
| WO | WO 2013/033470 | 3/2013 |

OTHER PUBLICATIONS

Dodge et al., "The Automatic Management of Drivers and Driving Spaces", Geoforum, vol. 38, Issue 2, pp. 264-275, Jul. 18, 2006.
Gehrmann et al., "Manual Authentication for Wireless Devices", Jan. 23, 2004, pp. 1-9.
Islam, Tofiqul "Design and Fabrication of Fare Meter of Taxicab Using Microcontroller", Dept. of Mechanical Engineering, Bangladesh University of Engineering and Technology, Dec. 30, 2005, pp. 1-5.
Jantarang et al., "A Low Cost Real-Time Intelligent Taximeter Sensor", Mahanakorn University of Technology, pp. 4, Bangkok, Thailand; 2002.
Keinzle Argo Taxi International; Taximeter Kienzle Argo 1155 Product Sheet; www.kati.de; 2 pages.
Lexmark International v. Static Control Components; No. 03-5400; US Court of Appeals for the Sixth Cirucuit; Oct. 2004; 26 pages.
"Nevada is the First State to Pass Driverless Car Legislation, Paving the Way for Autonomous Autos," available at http://www.popsci.com/cars/article/2011-06/nevada-passes-driverless-car-legislation-paving-way-autonomous-autos, on Sep. 7, 2011.
"Nevada Passes Law Authorizing Driverless Cars," available at http://www.forbes.com/sites/alexknapp/2011/06/22/nevada-passes-law-authorizing-driverless-cars/, on Sep. 7, 2011.
"Nevada Passes Law Permitting Autonomous Cars," available at http://blogs.cars.com/kickingtires/2011/06/nevada-passes-law-permitting-autonomous-cars.html, on Sep. 7, 2011.
Pulsar Technology Systems, Inc., Model 2030R; Copyright 2004; http://www.taxi-meters.cmo/2020R.htm; 1 page.
Pulsar Technology Systems, Inc.; Smart Taximeters the Last and Last; Model 2030; Copyrights 2004; http://www.taxi-meters.com/2030.htm; 1 page.
Taximeter (EM-1); Qingdao Turina Electronic Co., Ltd.; http://www.made-in-china.com/showroom/summerlee555/product-detailJbTEAFeOvYrt/China-Taximeter-EM-1-.html; Copyright 2011; 2 pages.
Taximeter (OM-1); Qingdao Turina Electronic Co., Ltd.; Copyright 2011; http://www.made-in-china.com/showroom/summerlee555/product-detailFMAJGybUqpRE/China-Taximeter-OM-1-.html; 2 pages.
Taximeter Taxi Meter (TM-2); Qingdao Turina Electronic Co., Ltd.; Copyright 2011; http://www.made-in-china.com/showroom/summerlee555/product-detaillqznHdiuHbYg/China-Taximeter-Taxi-Meter-TM-2-.html; 2 pages.
Taximeter (TM-4); Qingdao Turina Electronic Co. Ltd., Copyright 2011; http://www.made-in-china.com/showroom/summerlee555/product-detailGMfEaVeHFpYA/China-Taximeter-TM-4-.html; 2 pages.
Atallah, et al., "A Survey of Anti-Tamper Technologies", CERIAS Tech Report, Nov. 2004, Purdue University, West Lafayette, IN, pp. 12-16.
Cagalj et al., "Key Agreement in Peer-to-Peer Wireless Networks", Laboratory for Computer Communications and Applications, University of California, Los Angeles, pp. 1-11.
International Search Report and Written Opinion in International Application No. PCT/US2012/38422, dated Aug. 17, 2012.
Centrodyne, Silent 610 Electronic Taximeter, http://www.centrodyne.com/tax1page3.htm printed May 4, 2011 in 1 page.
Centrodyne, Silent 620 Electronic Taximeter, http://www.cnetrodyne.com/tax1page4.htm printed May 4, 2011 in 1 page.
Centrodyne, Smart Features, http://www.centrodyne.com/tax1page6.htm printed May 4, 2011 in 1 page.
FTDI Chip, USB-Key Datasheet, Jul. 17, 2008, Version 1.00, pp. 10.
Official Communication in Pakistani Application No. 317/2012, dated Apr. 11, 2013.

* cited by examiner

SYSTEM AND METHOD FOR INDEPENDENT CONTROL OF FOR-HIRE VEHICLES

REFERENCE TO CO-PENDING APPLICATIONS OF APPLICANT

The present disclosure contains subject matter that is related to applicant's co-pending applications:
SYSTEM AND METHOD FOR SECURING, DISTRIBUTING AND ENFORCING FOR-HIRE VEHICLE OPERATING PARAMETERS, Ser. No. 13/116,856 and
SYSTEMS AND METHODS FOR PAIRING OF FOR-HIRE VEHICLE METERS AND MEDALLIONS, Ser. No. 13/225,352, filed herewith,
which are both incorporated by reference in their entirety herein.

BACKGROUND

The present disclosure relates to the field of for-hire vehicles such as taxis, limousines, shuttles, buses or any other vehicle that provides shared transportation or transports one or more passengers between locations of the passengers' choice.

A for-hire vehicle (FHV) generally charges fares for transporting a passenger from one location to another. Some FHVs, such as taxicabs, operate with a meter. The primary purpose of a meter is to calculate fares for the passengers that hire the FHV. For example, the meter may charge an initial fee to start a trip and then may calculate a fee per every one-eighth mile traveled. The fares are generally displayed in a manner so that the passenger may view the calculation of the fare during the trip. A meter serves as a way to fairly and accurately calculate the total amount the passenger will be charged for the trip in the FHV. Meter-operated FHVs may differ from non-meter operated FHVs because in the former, the passenger's fare is calculated as the trip progresses while in the latter, the fare may be negotiated before the passenger is picked up.

The operation and maintenance of FHVs and meters is highly regulated. The entity charged with developing and enforcing the regulations ("regulatory agency") for a jurisdiction generally imposes several requirements on operators of FHVs. For example, the regulatory agency may require the operator to obtain a certificate of public convenience and necessity ("CPCN"), which certifies that the operator is fit to operate a FHV or fleet of FHVs and that the vehicle or vehicles used to transport members of the public comply with certain minimum standards. As used herein, CPCN (or "certificate") is meant to refer to the FHV owner's or operator's general certificate of license to operate as granted by the regulatory agency, jurisdiction, or governmental body, however denominated. A regulatory agency may also enforce geographic or time restrictions on the CPCN of a FHV operator. The geographic restrictions may restrict operation of a FHV to a limited area within the regulatory agency's jurisdiction of control, such as "west of the interstate" or "within the airport region." The time restrictions may restrict operation of a FHV to a particular time frame such as nights or weekends. Regulatory agencies may also issue permits or licenses to drivers of FHVs authorizing them to drive a FHV within the regulatory agency's jurisdiction for a period of time such as a year. In addition to certificates of public convenience and necessity (or FHV drivers' licenses), regulatory agencies may also issue medallions to meter-operated FHVs. Medallions are generally unique within a single jurisdiction and may be identified by a serial number, or medallion number and are associated with only a single FHV at any one time. Some medallions authorize unrestricted use of a FHV within the jurisdiction, while other medallions only authorize use during certain times or in certain geographic regions. For example, one medallion may permit twenty-four hour a day, seven day a week, operation, while another may only permit operation during certain hours on the weekends. Currently, in order for the FHV to be operating within regulations, its associated medallion must generally be displayed so that enforcement officers and/or passengers may view the medallion. Regulatory agencies may also impose other restrictions on the operation of FHVs that apply to all operators and are not specifically associated with a CPCN, medallion or permit. These general regulations may apply to FHVs of a certain type, such as taxicabs, and may relate to passenger safety, the environment, or other concerns within the public interest.

The combination of restrictions imposed by the regulatory agency through CPCNs, medallions, permits, and general regulations creates a set of rules that define the authorization for a FHV and driver to operate a FHV ("authorization rules"). For example, all of the medallions of an operator or driver will carry basic certificate restrictions, in addition to any restrictions placed on the specific medallions allocated to the operator, if any. For example, the regulatory agency may issue a certain number of medallions to all certificate holders in the jurisdiction that may be operated from noon to 2 AM, seven days per week. A FHV operator in the jurisdiction with a certificate restricting passenger pick-ups to a geographic area "west of the interstate," for example, could operate the new medallion from noon to 2 AM, 7 days a week, but only for pick-ups "west of the interstate" even though the newly issued medallions do not have geographic restrictions. On the other hand, competitors with unrestricted certificates could operate the same newly issued medallions during the permitted times and pick-up passengers anywhere within the jurisdiction. In addition, only those drivers with valid permits are allowed to operate a FHV. In addition, the general regulations may impose universal restrictions. For example, FHVs may not be permitted to operate above a certain speed when carrying a passenger.

Currently, the enforcement of authorization rules is limited to visual inspection. In some jurisdictions, medallions are affixed to the exterior of the FHV and may be color coded to indicate the scope of their authorization. Driver permits must be inspected by enforcement officers by asking the driver to provide evidence of their permit. FHVs may continue to operate, even outside the scope of their authorization rules, until an enforcement officer inspects a FHV, its current operating environment (such as the FHV's location and the current time) and indicia of its authorization such as its medallion, CPCN, or the driver's permit. FHVs may (and unfortunately often do) also accept passenger fares at times or in places not permitted by their authorization rules if there is no enforcement officer present to observe the conduct which is in violation of the scope of operation granted to the FHVs by the regulatory agency. Thus, adequate enforcement of authorization rules is dependent upon human intervention; an enforcement officer would need to be available at all times to inspect the medallion, certificate, and permit of all FHVs operating within a jurisdiction in order to ensure proper compliance. Compliant meter operation is also dependent upon human intervention. As a result, effective enforcement may be expensive and cost prohibitive in many jurisdictions. The present state of regulation in many, if not most, jurisdictions, is that, enforcement may be ineffective because there are not enough enforcement officers available to adequately ensure compliance.

DETAILED DESCRIPTION OF EMBODIMENTS

Figure 1:
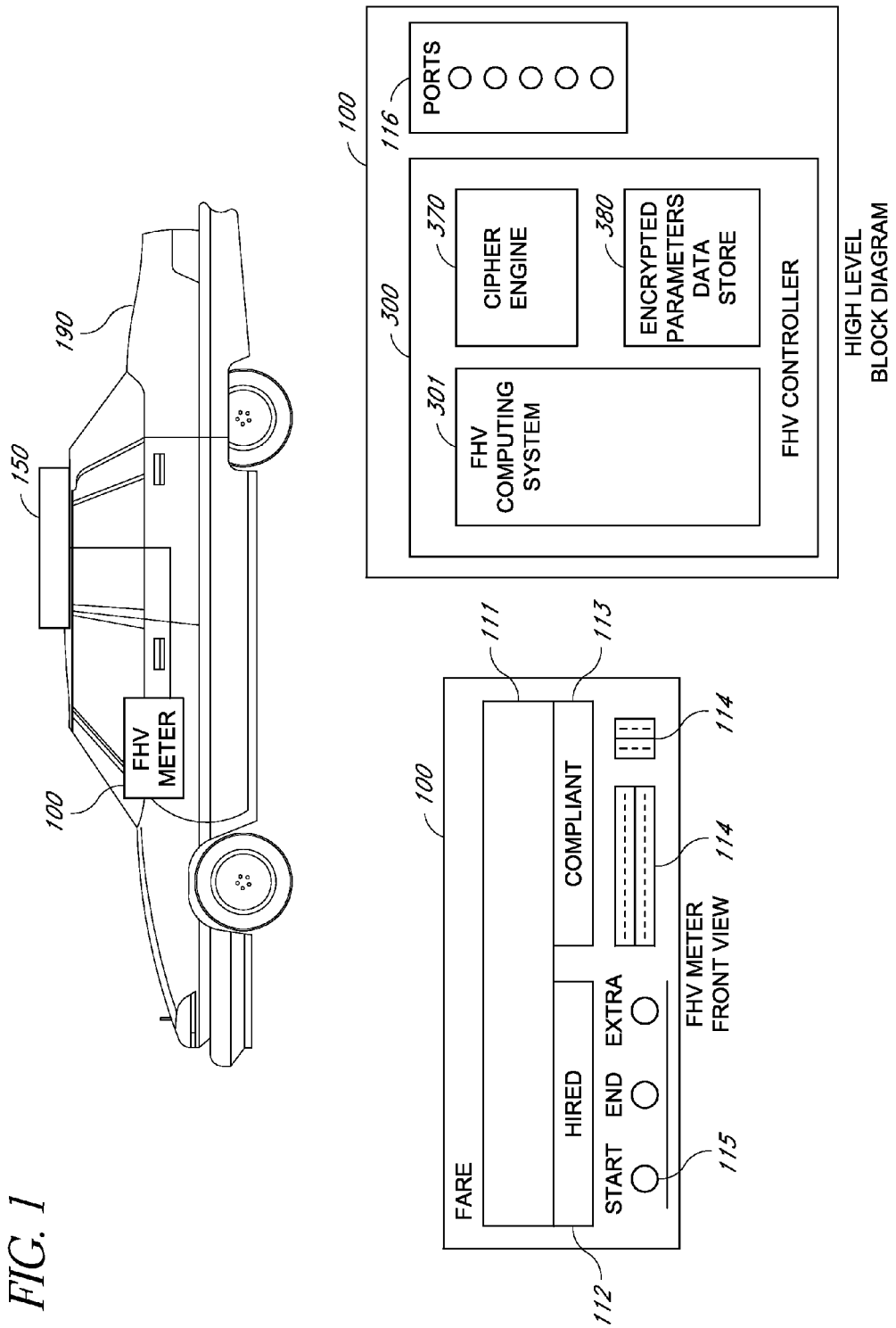
FIG. 1 is a block diagram, front view, and system high level block diagram showing one embodiment of a for-hire vehicle meter installed in a for-hire vehicle and connected to a status indicator.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Authorization rules and operating parameters for FHVs have significant policy underpinnings as evidenced by the fact that virtually all jurisdictions in the world that regulate vehicle transport of passengers promulgate and attempt to enforce such rules and parameters. Moreover, these rules and parameters are markedly similar the world over, involving time, geographic, fare, fare calculation, and other restrictions on FHV operation. As well, the historical antecedents to modern FHV rules and parameters (also very similar in content) trace, at least, to the nineteenth century pre-automobile livery industry and its regulation. See "Cab!", All the Year Round. pp. 414-416 (Feb. 25, 1860, Charles Dickens ed.) (recounting time, geographic, fare, and number of horses restrictions on for hire coaches and Hansom cabs, and cab stand limits of twenty cabs at a time, enacted by Parliament). Pervasive and time-honored, such authorization rules and parameters are designed to promote adequate, convenient, fairly priced and safe FHV transport for the riding public, as well as fair competition among industry participants. Meaningful realization of these policy objectives, however, is difficult if not impossible without effective enforcement, which to date has been lacking in many jurisdictions. This results in harm to the riding public (for example, long waits or inability to obtain a taxi ride, risks of using unlicensed, unregulated, illegal and unsafe FHVs, price gouging, and even extortion), and to the FHV industry (for example, asymmetric competition from unlicensed, unregulated FHV operators, or legal ones operating in violation of the rules).

Currently, there is no automatic means for effective enforcement of the rules and operating parameters of a FHV, that is, the meter of the FHV will continue to operate even though the FHV may be operating outside the authority granted by its medallion, its operator's certificate, the driver's permit, or any other general regulations imposed on FHVs by the regulatory agency. For example, if a meter-operated FHV has a medallion only authorizing it to accept passengers in the north side of the county, but the FHV is picking up passengers in the south side of the county, the meter will continue to calculate fares and will display no warning to passengers that FHV is operating without authorization.

Accordingly, the embodiments described in the present disclosure provide systems and methods for enforcing authorization rules on a FHV by programming the FHV's meter with the expiration and exclusion parameters corresponding to the restrictions imposed on the FHV by its medallion, certificate, the driver's permit, or any other general regulations. A FHV meter may have means for determining its current operating environment. The current operating environment may be determined by receiving sensor data from sensors that are part of, or attached to, the FHV meter. The FHV meter may also have means for comparing the current operating environment to the expiration and exclusion parameters programmed within the FHV meter. If the current operating environment does not comply with the expiration and exclusion parameters, the FHV meter may take an appropriate course of action such as shutting down or not permitting the driver to initiate a new passenger fare (or become "first engaged") until the state of the FHV meter changes so that it complies with the expiration and exclusion parameters. This approach permits automatic and immediate enforcement of the authorization rules of a FHV and may act as a fail safe in the event of non-action on the part of the regulatory agency or enforcement officer. Thus, the need for a large enforcement staff or the application of medallions to FHVs may be reduced or eliminated.

Embodiments of the disclosure also describe a for-hire vehicle meter comprising a secured, tamper-evident portion. The secured, tamper-evident portion may comprise a tamper-evident, tangible, computer-readable medium storing software instructions for receiving updated expiration and exclusion parameters ("operating parameters" or "FHV parameters"). The received parameters may be sealed by the regulatory agency using a security protocol, such as encryption. The FHV meter comprises a means for decrypting the expiration and exclusion parameters. Once decrypted, the FHV meter may store the expiration and exclusion parameters and operate accordingly, for example, by comparing the current operating environment of the FHV meter to the parameters and taking an appropriate course of action based on the comparison.

The present disclosure also describes a method for updating the operating parameters of a for-hire vehicle ("FHV") meter whereby a computer system for defining or storing authorization rules generates a data packet that is distributed to one or more FHV meters. The computer system may also maintain data associated with the one or more FHV meters, including data uniquely identifying the meters. The computer system may also have access to a security protocol of the FHV meters that is used by the FHV meters to decrypt data. When the operator of the computer system wishes to update the operating parameters of the FHV meters, it may generate a data packet containing the new parameters. The computer system may then secure the data packet according to the security protocol of the FHV meter. Once the data packet has been generated and secured, it may then be distributed to the FHV meter for which it is intended. The data packet may include operating parameters corresponding to the authorization rules indicating the terms of operation of the for-hire vehicle. The data may comprise one or more boundary conditions defining an operational range of the for-hire vehicle. The boundary conditions may be temporal or time based, or they may be geospatial or area based.

The embodiments disclosed herein and in co-pending applications SYSTEM AND METHOD FOR SECURING, DISTRIBUTING AND ENFORCING FOR-HIRE VEHICLE OPERATING PARAMETERS, Ser. No. 13/116,856 and SYSTEMS AND METHODS FOR PAIRING OF FOR-HIRE VEHICLE METERS AND MEDALLIONS, Ser. No. 13/225,352 which are incorporated by reference in their entirety herein, will advantageously enhance regulatory enforcement of for-hire vehicle authorization rules and parameters and help serve the important policy objectives behind the authorization rules and parameters. Automatic enforcement by operation of the meter based upon instructions obtained from the regulator will advantageously permit more complete enforcement of authorization rules and parameters than the present system, which relies primarily upon observation of violations by officers of the regulatory agency, audits, sting operations and other time-intensive, expensive procedures.

FIG. 1 is a block diagram showing one embodiment of FHV Meter 100 installed in FHV 190 and connected to status indicator 150. FHV Meter 100 is responsible for calculating the cost of a trip for a passenger when the passenger hires FHV 190. In the embodiment of FIG. 1, FHV Meter 100 is depicted as a stand-alone unit that may be attached to the interior of FHV 190. FHV Meter 100 may be, as depicted in FIG. 1, attached to the dashboard or the windshield of FHV 190. Although FHV Meter 100 is depicted as a stand-alone unit attached to FHV 190, a skilled artisan will appreciate that the functionality described herein may not be limited to a stand-alone unit. In some embodiments, FHV Meter 100 may be incorporated within the computer system of FHV 190, and FHV Meter 100 may utilize existing inputs (for example buttons, touchscreens, switches, and levers) of FHV 190 to input information and may also utilize existing outputs (for example LCD, LED, and analog dials) to output information.

FIG. 1 also depicts a high-level block diagram of one embodiment of FHV Meter 100. In the exemplar embodiment of FIG. 1, FHV Meter 100 includes FHV Controller 300. At a high level, FHV Controller 300 may include a FHV Computing System for controlling the general operation of FHV Meter 100, cipher engine module 370 for decrypting data packets describing the expiration and exclusion parameters of FHV 190 that have been sealed and secured by the regulatory agency, and an encrypted parameter data store 380 which stores the data packets. FHV Controller 300 controls the operation of FHV Meter 100 with the methods disclosed herein. Advantageously, FHV Controller 300 independently controls FHV 190 by comparing the exclusion and expiration parameters stored in encrypted parameter data store 380 to sensor data received either from internal sensors of FHV Controller 300 (as described with respect to FIG. 3) or from external sensors connected to FHV Meter 100 via ports 116 (as described with respect to FIG. 2) and taking action, such as shutting down FHV Meter 100 or not allowing FHV Meter 100 to accept new fares (become "first engaged"), if the sensor data does not match the exclusion and expiration parameters.

In some embodiments, the exclusion and expiration parameters ("FHV parameters" or "operating parameters") may include parameters corresponding to the authorization rules associated with FHV 190. The values may be, in some embodiments, temporal parameters corresponding to the term of a medallion, certificate or permit, such as the start date and the end of the certificate, or the start date and end date of a medallion. For example, in some jurisdictions, a regulatory agency may grant a certificate to operate a FHV for a year. The certificate may begin on a first date, and the certificate may terminate on a second date a year later. For example, the first date may be May 1, 2011 and the second date may be Apr. 30, 2012. In such an embodiment, a FHV parameter may correspond to the first date and the second date. The format of a temporal parameter may be an integer (for example, the number of seconds since the epoch), a string (such as "May 1, 2011"), a data object, XML object, or any format for conveying a date or time among computer systems.

In some embodiments, regulatory agencies may grant medallions or certificates to operate a FHV for a sub-region within its jurisdiction of control. For example, a regulatory agency may only grant a medallion for an FHV to operate within the north half its jurisdiction of control, or may only allow an FHV to operate on specific streets within its jurisdiction of control. In such embodiments, FHV parameters may include a set of geospatial points that define the boundaries of the sub-region for which the medallion applies. In one embodiment, the set of geospatial points represent a polygon defining the boundaries of the validity of the license. The geospatial points may be formatted as geodetic coordinates such latitude and longitude coordinates, Earth-Centered, Earth-Fixed Cartesian (ECEF) coordinates (ECEF), Universal Transverse Mercator (UTM) coordinates, Military Grid Reference System (MGRS) coordinates, World Geographic Reference System (GEOREF) coordinates, etc. The geospatial points may, in some embodiments, be defined in a format such as an XML object or data object. In other embodiments, the geospatial points may be defined as strings, or numerical values, if appropriate, or any other format for conveying position information among computer systems known in the art. In addition to medallions, certificates may also only allow operation of a FHV in certain sub-regions within the regulatory agency's jurisdiction of control. FHV parameters corresponding to certificate rules may take a similar format as the FHV parameters corresponding to medallion rules.

In some embodiments, regulatory agencies may grant medallions or certificates to operate a FHV for a recurring periodic time, such as, weekends, daytime or nighttime. In such embodiments, the medallion or certificate may allow the FHV to accept passengers and fares only during the recurring periodic time. For example, a regulatory agency may grant a certificate to operate a FHV only on the weekends. FHV parameters may reflect recurring periods of operation corresponding with the terms of the certificate. For example, if a certificate to operate a FHV specifies that the FHV may only accept fares on Thursday nights, the FHV parameters may be defined indicating that the corresponding FHV meter may only operate on Thursday nights. The FHV parameters may indicate a first temporal value indicating the start time of the recurring period of operation and second temporal value indicating an end time of the recurring period of operation. For example, if the recurring period of operation is a weekend, the first temporal value may correspond to Friday at noon and the second temporal value may correspond to Sunday at 11:59

PM. The FHV parameters may also include an indication that the first temporal value and the second temporal value reference a recurring period of operation as opposed to a one-time period of operation. The format of the first and second temporal values may be integers (for example, the number of second since the epoch), a string (such as "Friday 6 PM"), a data object, XML object, or any format for conveying a date or time among computer systems.

Figure 2:
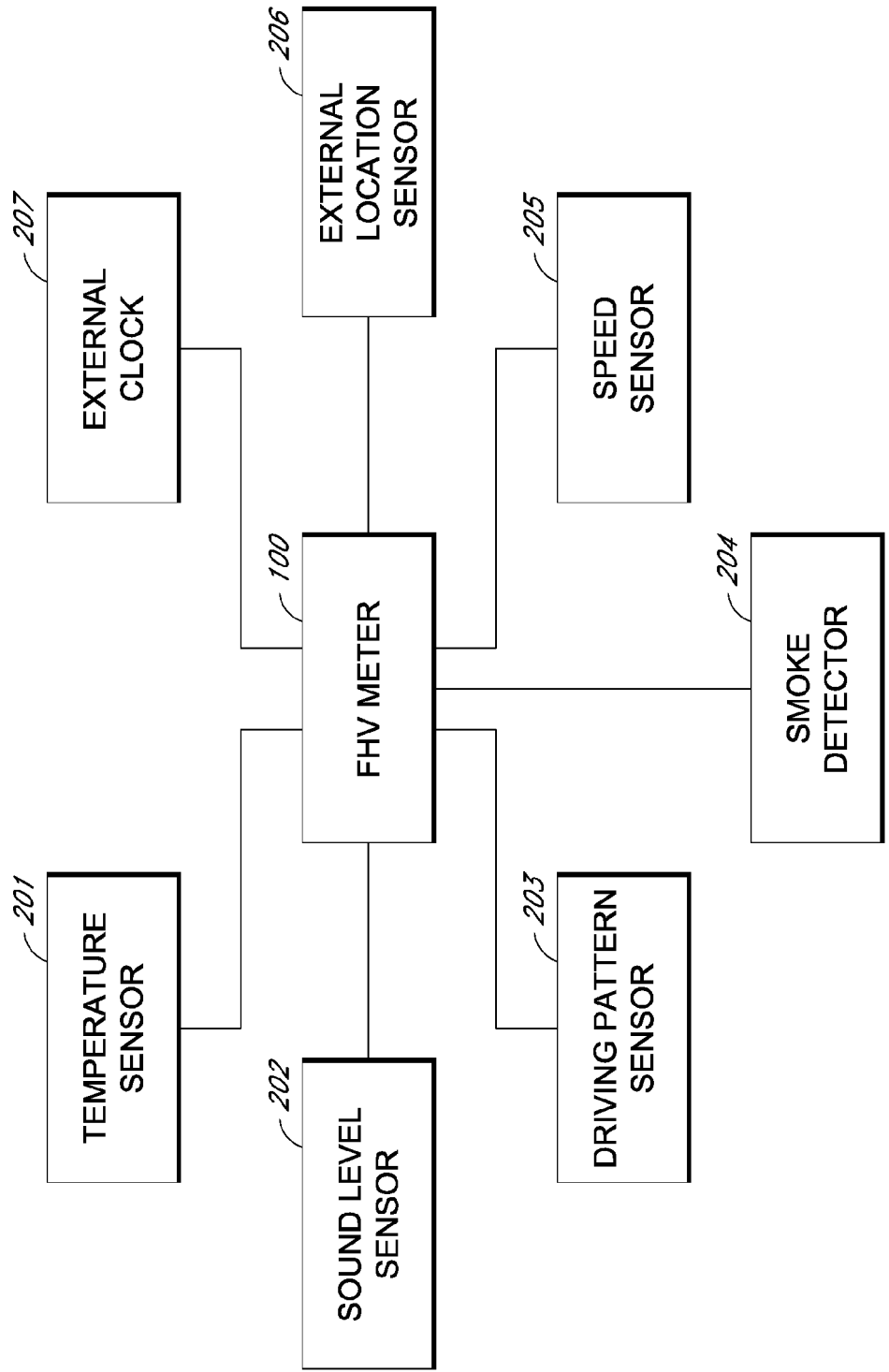
FIG. 2 is a block diagram showing one embodiment of a for-hire vehicle meter in communication with a various sensors.

In some jurisdictions, the regulatory agency may place additional restrictions on the operation of FHVs that relate to the safety or comfort of passengers who hire the FHV. These restrictions may be general restrictions, that is, they apply generally to all FHVs under the regulatory agency's control. In such embodiments, FHV Meter 100 may include, or be connected to, additional sensors for detecting the current operating environment of the FHV or FHV Meter 100 associated with the restriction. FIG. 2 is a block diagram showing one embodiment of FHV Meter 100 connected to various sensors that may be used by FHV Meter 100 to determine the current operating environment. It can be appreciated by those skilled in the art that in some embodiments not all of the sensors depicted in FIG. 2 may be present. It an also be appreciated that in some embodiments, the separate blocks of FIG. 2 do not necessarily represent separate sensors or devices and may be part of FHV Meter 100. The sensors of FIG. 2 include temperature sensor 201 for detecting the internal or external temperature of the FHV in which FHV Meter 100 is located, sound level sensor 202 for detecting internal sound pressure or sound levels, driving pattern sensor 203 for sensing the driving patterns of the driver driving the FHV, smoke detector 204 for detecting the presence of smoke, speed sensor 205 for detecting the speed of the FHV, external location sensor 206 which may determine the location of the FHV, and external clock 207 which may determine the current time. One skilled in the art can appreciate that the sensors depicted in FIG. 2 may be commercially available sensors that advantageously connect to FHV Meter 100 via ports 116 which may include, for example, RS 232 serial port, USB port, wireless or any other means of connecting peripherals to a computing system known in the art.

A regulatory agency may decide that, in the best interest of passengers, FHVs must maintain a certain interior temperature range and may pass a general regulation, or certificate restriction, to that effect. For example, the interior of the FHV may not exceed 85 degrees, and may not go below 65 degrees. In some embodiments, FHV parameters may indicate a first boundary value indicating the lowest allowable interior temperature and they may also indicate a second boundary value indicating the highest possible temperature. The format of temperature boundary values may be integers, a string, a data object, XML object or any other format known in the art capable of representing a temperature value. In some embodiments, the FHV parameters may also include an indication if the temperature values are on the Fahrenheit, Celsius, or Kelvin temperature scales.

Regulatory agencies may also, in the best interest of passengers, set a maximum speed for FHVs when they have accepted a fare, for example, 65 miles per hour. Thus, regulatory agencies may pass a general regulation that a FHV must not exceed the maximum speed while a passenger is taking a trip. FHV parameters may then, in some embodiments, include a maximum speed parameter reflecting the agency determined maximum speed. The format of maximum speed value FHV parameters may be integers, a string, a data object, XML object or any other format known in the art capable of representing a speed value. In some embodiments, the FHV parameters may also include an indication if the maximum speed is in miles per hour or kilometers per hour. In other embodiments, FHV parameters may include a value that indicates the locally posted speed cannot be exceeded by a predetermined above-speed-limit value. For example, the FHV parameter may define the predetermined above-speed-limit value to be 7 miles per hour. In such instances, FHV Meter 100 may coordinate with other computer systems to determine the speed limit at the FHV's current location. If the FHV is traveling at a speed higher than 7 miles per hour above the current speed limit, FHV Meter 100 may issue a warning on its display, or it may generate some other form of audible or visual alert.

In other embodiments, FHV parameters may represent a maximum sound level for the interior of the FHV. Regulatory agencies may wish to limit passengers' or drivers' exposure to loud noises while inside FHVs. As a result, they may pass regulations setting a maximum sound level as detected from the interior of the FHV by a sensor such as sound level sensor 202. The maximum sound level may be a one time sound level, such as 130 db (the threshold of pain), or could be an average sound level per time, such as 70 db per 24 hours (the EPA-identified maximum to protect against hearing loss). The format of maximum sound level FHV parameters may be integers, a string, a data object, XML object or any other format known in the art capable of representing a speed value.

In some embodiments, FHV parameters may represent a value indicating that smoking is not permitted inside a FHV. The format for the value may be binary value, or flag. The value may also be in the format of an integer, a string, a data object, XML object, or any other format known in the art that is capable of representing a binary value.

In some embodiments, for-hire vehicle ("FHV") parameters may be grouped together. In such embodiments, group-FHV parameters may apply to a collection of FHV parameters to indicate that they are to apply only when the conditions of the group-FHV parameters are met. For example, in some embodiments, it may be desirable to limit the application of FHV parameters to a specific period of time. This would be advantageous, for example, when a regulatory agency may wish to issue a temporary medallion, certificate or permit to accommodate a special event. In such embodiments, there may be additional group-FHV parameter indicating the start time and/or end time for the set of FHV parameters. For example, special fare rates may apply to weekends, holidays or special events. Accordingly, the FHV parameters may be include a start date and end date that correspond to the weekend, holiday or special event. In other embodiments, it may be desirable to define FHV parameters for mutually exclusive geospatial regions within the FHV's operating region. For example, suppose a FHV serves a north region and south region. The north region may be larger and less developed than the south region. As a result, when a FHV makes a trip from the airport into the north region, there is low likelihood that the FHV will be able to pick up another passenger in the north region to bring back to the airport. Accordingly, fare rates for the north region may be higher than for the south region where the FHV is more likely to pick up another passenger quickly. In this example, FHV parameters for the north region may be different from FHV parameters from the south region. The north region's FHV parameters may be grouped by one group-FHV parameter defining a first geospatial polygon (the north region) and the south region's FHV parameters may be grouped by a different group-FHV parameter defining a second geospatial polygon (the south region).

A regulatory agency may also wish to revoke the authorization granted to a FHV. This may occur, for example, when the FHV has been deemed unfit to accept passengers, or when the owner of the FHV had failed to comply with the regulations adopted by the regulatory agency. As a result, in some embodiments, FHV parameters may represent a value indicating that a FHV, and its associated meter, may operate. The value may be binary. In such embodiments, if the value is "true" or 1, the FHV may operate and accept passengers subject to the authorization rules embodied in additional expiration or exclusion parameters that are sent to the FHV meter. If, on the other hand, the value is "false" or 0, then the FHV and its associated meter may not be permitted to operate at all, regardless of any additional authorization rules associated with the FHV. Such a parameter allows a regulatory agency to advantageously revoke the authorization rules of a FHV as needed. The format for the value may be binary value, or flag. The value may also be in the format of an integer, a string, a data object, XML object, or any other format known in the art that is capable of representing a binary value.

In addition to the regulations and associated FHV parameters described herein, it can be appreciated by the skilled artisan that additional FHV parameters may be defined to accommodate the needs and desires of regulatory agencies that monitor, control and other wise regulate for-hire vehicles.

FHV Meter 100 may, in some embodiments, be connected to status indicator 150. Advantageously, status indicator 150 provides indicia of the availability of FHV 190 to accept fares. For example, status indicator 150 may be illuminated when FHV 190 may accept fares. In some embodiments, status indicator 150 may comprise a configurable display, such as a video screen, which may provide indicia indicating that availability of FHV 190. For example, the indicia may comprise a special color, such as green, to indicate that the FHV may accept a fare. The indicia may also comprise text such as "FOR HIRE" or "NOT IN SERVICE" to advantageously communicate to the public whether the FHV is available. In some embodiments, status indicator 150 may be in communication with FHV Meter 100. In such embodiments, status indicator 150 may only provide indicia that are available when FHV Meter 100 is operating in accordance with the expiration and exclusion parameters stored in encrypted parameters data store 380.

FIG. 1 also shows a front view of one embodiment of FHV Meter 100. In the exemplary embodiment of FIG. 1, FHV Meter 100 includes display 111. Display 111 may, in some embodiments, be a LCD screen, LED screen, touchscreen, or any other computer controllable visual display. Display 111 may advantageously provide fare information to both the passenger and the driver of FHV 190. FHV Meter 100 may also include hired status indicator 112, that is illuminated while the meter is engaging a fare, and is not illuminated when FHV Meter is not engaging a fare. FHV Meter 100 may also include compliance status indicator 113, which may illuminate when FHV Meter 100 is operating in accordance with the expiration and exclusion parameters stored within encrypted parameters data store 380. While display 111, hired status indicator 112, and compliance status indicator 113 are shown in FIG. 1 as separate displays, one skilled in the art will appreciate that they may be advantageously combined.

In some embodiments, FHV Meter 100 may also include ports 114 for input of parameters. For example, in the embodiment depicted in FIG. 1, a regulatory agency may program FHV Meter 100 with its secure, encrypted data packet comprising FHV operating parameters by interfacing with ports 114. Ports 114 may be a USB port or RS 232 port as shown in FIG. 1. A skilled artisan will appreciate that any standard means of interfacing two computing devices may be used to upload, or store, encrypted data packets on FHV Meter 100.

The front of FHV Meter 100 may also include input buttons 115 for first engaging a fare ("START"), ending the engagement of a fare ("END") or for apply extra surcharges ("EXTRA") to a fare as permitted by the regulatory agency (for example, to accommodate for tolls). Input buttons 115 advantageously allow the driver of FHV 190 to engage a fare. As described herein, a driver may not be able to engage a fare if the current state of FHV Meter 100 does not comply with the expiration and exclusion parameters embedded with the secure, encrypted data packet stored within encrypted parameters data store 380. In some embodiments, the START input button contains a light that is illuminated when FHV Meter 100 complies with the stored parameters. In other embodiments, the START input button may illuminate one color, such as green, when FHV Meter 100 is in compliance, and may illuminate another color, such as red, when FHV Meter 100 is not in compliance with the stored parameters.

Figure 3:
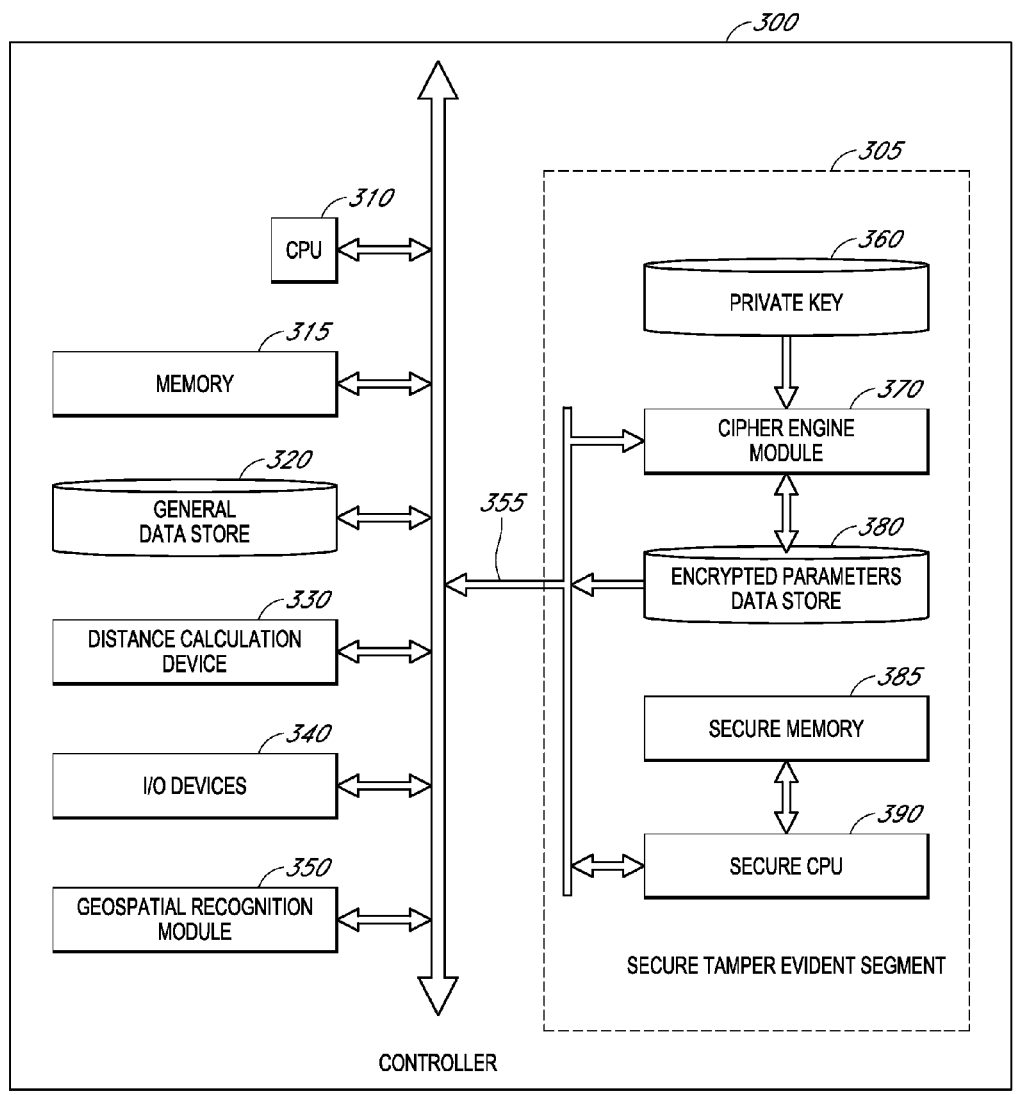
FIG. 3 is a block diagram showing one embodiment of a controller for a for-hire vehicle meter.

FIG. 3 is a block diagram showing one embodiment of FHV meter 100. In the exemplary embodiment of FIG. 3, FHV meter 100 may be a dedicated computing device that attaches to, or on, a FHV and has external interfaces for communicating with other computer systems attached to, on, or in the FHV. In other embodiments, FHV meter may be a separate computing module that is part of the existing computer system of the FHV. In such embodiments, the FHV meter may be not be visible from within the interior of the FHV meter, and the FHV meter may make use of existing input/output devices of the FHV for displaying information, such as fare information, to the driver and passenger of the FHV.

In one embodiment, FHV meter 100 is configured to interface with multiple devices and/or data sources, such as in the exemplary network of FIG. 1 and exemplary block diagram of FIG. 2. FHV meter 100 may be used to implement certain systems and methods described herein. For example, in one embodiment, FHV meter 100 may be configured to calculate fares for passengers that hire for-hire vehicles ("FHVs"). FHV meter 100 may also be configured to receive and decrypt FHV operating parameters and operate according to those parameters. The functionality provided for in the components and modules of FHV meter 100 may be combined into fewer components and modules or further separated into additional components and modules.

In one embodiment, FHV meter 100 comprises secure tamper evident segment ("secure segment") 305. Secure segment 305 represents the components and modules of FHV meter 100 that must be secure from tampering, or show evidence of tampering, in order to abide by the regulations and laws governing for-hire vehicles ("FHVs"). In some embodiments, secure segment 305 may be self destructing, that is, if someone tampers with secure segment 305, the components and modules of secure segment 305 will no longer operate. For example, the storage medium storing software instructions for the modules of secure segment may break, or split, if there is an attempt to remove the storage medium from FHV meter 100. In one embodiment, the degree of tampering detected may advantageously signal different levels of response. For example, if the tampering is physical or certain (for example a secure component is removed or replaces), the FHV meter might automatically shut down or not become first engaged. If the tampering is only likely but not certain (for example a signal security check is invalid) then a warning signal might be triggered so that when the regulatory agency or fleet owner inspects the meter, they will be advantageously notified that tampering has occurred.

In general, the word module, as used herein, refers to logic embodied in hardware or firmware, or to a collection of software instructions stored on a non-transitory, tangible computer-readable medium, possibly having entry and exit points, written in a programming language, such as, for example, C, C++, C#, or Java. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules may be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more CPUs in order to cause FHV meter 100 to perform particular operations.

It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, FHV meter 100, includes a dedicated computer that is IBM, Macintosh or Linux/Unix compatible. In another embodiment, FHV meter 100 may be a customized computing device configured only to operate as a meter in a for-hire vehicle. In another embodiment, FHV meter 100 may be a module that is part of the internal computing system of the for-hire vehicle. FHV meter 100 may, in some embodiments, include one or more central processing units ("CPU") 310, which may include one or more conventional or proprietary microprocessors. FHV meter 100 may further include memory 315, such as random access memory ("RAM") temporary storage of information and read only memory ("ROM") for permanent storage of information, and general data store 320, such as a hard drive, diskette, or optical media storage device. In certain embodiments, general data store 320 stores data needed for the basic functioning of FHV meter. In other embodiments, general data store 320 might store historical trip information. Embodiments of general data store 320 may store data in databases, flat files, spreadsheets, or any other data structure known in the art. Typically, the modules of FHV meter 100 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, FHV meter 100 leverages computing and storage services available over the Internet (cloud computing).

In one embodiment, general data store 320 contains a data structure, or data element, that uniquely identifies FHV meter 100. In some embodiments, the data element may be an integer that represents the serial number of the FHV meter. In other embodiments, the data element may be a string or a character array that is unique to FHV meter 100. For example, the data element might be 12345678 or "09GTR67RXY." In other embodiments, the unique identifier may be an object or a data structure with several elements that when combined represent a unique identifier for the FHV meter. For example, the make and model of the FHV meter, combined with the license plate number and registration state of the FHV may be used in combination to uniquely represent the FHV meter.

FHV meter 100 is generally controlled and coordinated by operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, FHV meter 100 may be controlled by a proprietary operating system. Conventional operating systems control and schedule computer processes for execution, perform memory management, provide file system, networking, and I/O services, and may provide a user interface, such as a graphical user interface ("GUI") for display, among other things.

FHV meter 100 may include, in some embodiments, distance calculation device 330 for calculating the distance traveled by the FHV. Distance calculation device 330 may be a separate computer system from FHV meter 100, or as in the embodiment depicted in FIG. 2, a module of FHV meter 100. For example, distance calculation device 330 may be part of the internal computer system of the for-hire vehicle that FHV meter 100 is connected, or it may be a dedicated computer that is connected to FHV meter via input/output ("I/O") devices and interfaces 340. Distance calculation device 330 may receive input pulses representing the number of turns of the FHV's wheels. The input pulses, in some embodiments, may be received from I/O devices and interfaces 340. The input pulses may be generated by a dedicated device for counting wheel turns, or in some embodiments, the input pulses may be generated by FHV's internal computer system. Distance calculation device 330 may send calculated distance values to CPU 310 which may then in turn be used to calculate fares based on operating parameters.

FHV meter 100 may include one or more commonly available I/O devices and interfaces 340, such as for example, a printer, buttons, a keyboard, a LED display, a monitor, a touchpad, a USB port, a RS 232 port and the like. In one embodiment, I/O devices and interfaces 340 include one or more display devices, such as a monitor, that allows the visual presentation of data, such as fare and operation data, to a user. In the embodiment of FIG. 3, I/O devices and interfaces 340 provide a communication interface to various external devices. For example, in this embodiment FHV meter 100 is in communication with a distribution network, such as any combination of one or more LANs, WANs, or the Internet, for example, via a wired, wireless, or combination of wired and wireless, connections via a network interface of I/O devices and interfaces 340. The communications interface may also include, for example, ports for sending and receiving data such as a USB port or an RS 232 port. In some embodiments, FHV meter may communicate with one or more external devices such as the FHV internal computer system, a printer, a GPS device, etc. by sending and receiving data on ports such as a USB port or a RS 232 port.

In some embodiments, FHV meter 100 may be connected to one or more sensors as shown in the exemplar embodiment of FIG. 2. In such embodiments, I/O devices and interfaces 340 may advantageously include ports for connecting FHV meter 100. The ports may be standard, commercially available and known ports such as a USB port or an RS 232 port, or they may be custom ports designed to interface only with the one or more sensors. It can be appreciated by those skilled in the art that any means of connecting two hardware devices, or two computers, may be used to connect the sensors to I/O devices and interfaces 340.

In one embodiment, the FHV meter may have geospatial recognition module 250. Geospatial recognition module 250 may include a GPS receiver for receiving GPS coordinates from GPS satellites. In some embodiments, the GPS coordinates received from geospatial recognition module 250 may be used to calculate fares based on FHV parameters stored in operating parameters data store 270. In other embodiments, geospatial recognition module 250 may be used to determine the current operating environment of FHV meter 100. For example, the current location detected by geospatial recognition module 250 may determined as the current operating environment value when FHV meter 100 determines if it is operating in compliance with its authorization rules, or the expiration or exclusion parameters stored within operating parameters data store 380.

Secure segment 305 of FHV meter 100 may, in some embodiments, include a private key 360. Private key 360 may be, in some embodiments, software instructions and/or data used to decrypt data. In one embodiment, private key 360 is hard-coded on firmware such as programmable read-only memory ("PROM") and may be unique to the embodiment of FHV meter 100. In other embodiments, private key 360 may not be unique and may be the same in one or more embodiments of FHV meter 100. The PROM storing private key 360 may be self destructing if tampered with, that is, if the PROM is removed from the FHV, it will snap and self destruct. For example, epoxy may be placed over private key 360 such that it could not be removed from secure segment 305 without chipping or damaging private key 360.

In one embodiment, secure segment 305 of FHV meter may also include cipher engine module 370. Cipher engine module 370 may, in some embodiments, contain software instructions used to decipher coded or encrypted data packets containing FHV parameters. Cipher engine module 370 may use private key 360 to decrypt data packets received from distribution network 130. Cipher engine module 370 may also include software instructions for extracting FHV parameters and storing them in operating parameters data store 380. In some embodiments, cipher engine module 370 may be a hardware based cipher engine, that is, it may be hard coded to firmware such as PROM. The PROM storing cipher engine module 370 may be self destructing if tampered with, that is, if the PROM is removed from the FHV, it will snap and self destruct. For example, epoxy may be placed over cipher engine module 370 such that it could not be removed from secure segment 305 without chipping or damaging it.

FHV meter 100 may also include encrypted parameters data store 380. Encrypted parameters data store 380 may, in some embodiments, store the operating parameters, or expiration and exclusion parameters, by which FHV meter 100 operates. For example, CPU 310 may access encrypted parameters data store 380 when determining whether FHV meter 100 is operating within the scope of the authorization rules associated with FHV meter 100 or the FHV in which FHV meter 100 is located. Encrypted parameters data store 380 may be, in some embodiments, a secure data store. In one embodiment, encrypted parameters data store 380 may only be accessed for writing by cipher engine module 370. Thus, while CPU 310 may access encrypted parameters data store 380 for reading FHV operating parameters, CPU 310 would not be able to perform write operations to encrypted parameters data store 380. Accordingly, FHV parameters cannot be changed by software instructions stored in general data store 320, memory 315, or some other data store connected to FHV meter 100. This may, in some embodiments, be accomplished by only wiring the write pins of encrypted parameters data store 380 to the firmware containing the software instructions for cipher engine module 370. For example, encrypted parameters data store 380 may be a RAM chip whereby only cipher engine module 370 is connected to the write pins of the RAM. In some embodiments, encrypted parameters data store 380 may self-destruct if someone tampers with the configuration. In other embodiments, encrypted parameters data store 380 may be physically connected to FHV with a tamper evident seal that indicates one state if someone tampers with encrypted parameters data store 380 and another state if no one has tampered with encrypted parameters data store 380.

FHV meter 100 may include secure memory 385 and secure CPU 390. Secure memory 385 may be a non-transitory, tangible, computer readable medium such as random access memory ("RAM") for temporary storage of information and read only memory ("ROM") for permanent storage of information. Secure memory 385 may store software instructions that cause secure CPU 390 to perform the methods of the embodiments described herein.

Figure 4:
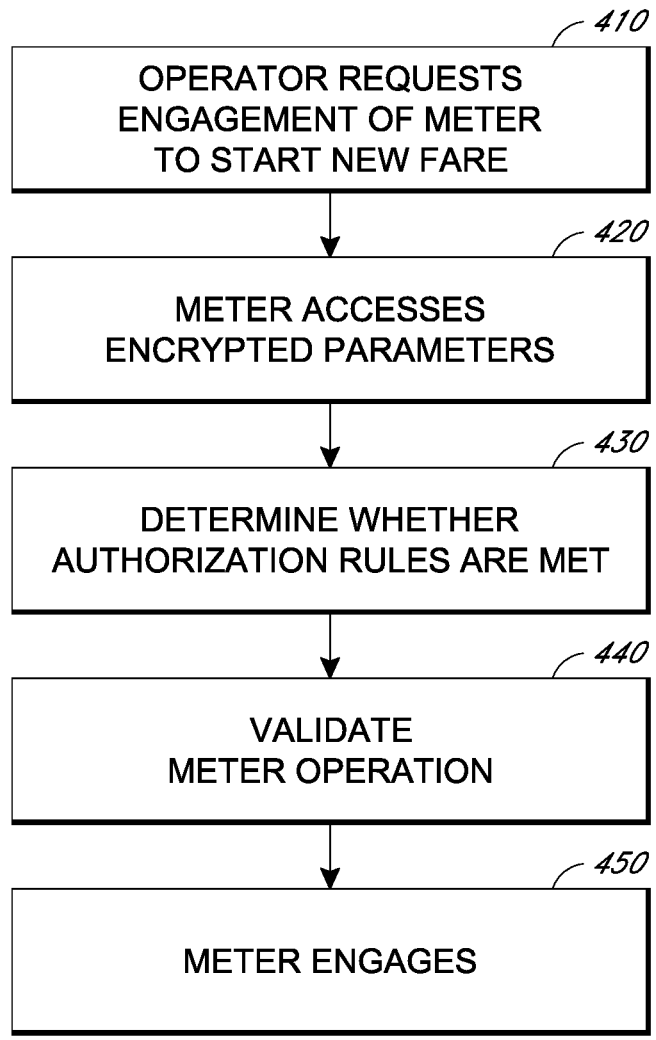
FIG. 4 is a flowchart showing the temporal flow of data for processing the first engagement of a FHV Meter.

FIG. 4 is a flow chart describing one embodiment of the first engagement of a FHV Meter. When a passenger hires FHV 190, the operator of FHV 190 may attempt to engage FHV Meter 100 to start a fare for that passenger at box 410. The operator may press a button or turn a dial on FHV Meter 100 that will create a signal within FHV meter to start the fare. In box 420, FHV Meter 100 accesses the stored operating parameters, including expiration and exclusion parameters, from encrypted parameters data store 380. In some embodiments, FHV Meter 100 may decrypt the stored operating parameters with cipher engine module 370. In other embodiments, the operating parameters may have been already decrypted, and FHV Meter accesses them without the need for decryption.

At box 430, a determination is made as to whether the authorization rules are met. The authorization rules are embodied in operating parameters accessed with respect to box 420. This may be advantageously done by verifying that FHV Meter 100's current operating environment, or current state, falls within the authorization rules stored as operating parameters in encrypted parameters data store 380. The authorization rules may, for example, provide authorization to operate FHV 190 twenty-four hours a day, seven days a week and for all regions within the jurisdiction without any other restrictions. In such embodiments, processing moves to box 450. In other embodiments, where the authorization rules restrict the use of the FHV to certain times or geographic locations, FHV Meter 100 must determine its current operating environment. Advantageously, FHV Meter 100 determines its state via geospatial recognition module 350. From geospatial recognition module 350, or from the one or more sensors described with respect to FIG. 2, FHV Meter 100 may determine its current operating environment such as its current location, current time, current interior temperature, current sound level, or the presence of smoke. FHV Meter 100 then processes its current operating environment by comparing the current operating environment to its authorization rules. For example, if the authorization rules only authorize pick-ups, i.e., first engagement of its associate meter, on the south side of the jurisdiction, FHV Meter 100 may be programmed with a set of expiration or exclusion parameters defining the boundaries of the south side of the jurisdiction. For example, the boundaries may be GPS coordinates defining the boundaries, or they may be landmarks such as roads or railway tracks. Once FHV Meter 100 determines its current location, it can compare the current location to the boundaries and determine if it is currently within its boundaries. The expiration or exclusion parameters may also include an expiration date of a medallion, certificate, or permit. In such embodiments, FHV Meter 100 may determine its current operating environment from an internal computer clock or from geospatial recognition module 350 and then compare that current operating environment (date) to the storied expiration date of the expiration or exclusion parameters.

In box 440, FHV Meter 100 operation is validated. In some embodiments, if the current operating environment determined by FHV Meter 100 falls within its authorization rules, processing moves to box 450 and FHV meter 100 engages. If, on the other hand, the current operating environment does not fall within the authorization rules, then FHV Meter 100 will not engage. For example, the authorization rules may only provide authorization to the FHV to pick up passengers on the weekend. FHV Meter 100 may check the current operating environment and determine that the current day is Saturday. Processing then moves to box 450 and FHV meter 100 engages. If, however, FHV Meter 100 determined the current day was Wednesday, then FHV meter 100 will not engage.

At box 450, once FHV meter 100 validates operation, it engages the fare. Once FHV Meter 100 engages, it will continue to operate until the fare is over. Thus, once first engaged, FHV Meter 100 may operate outside the pick-up (first engagement) authorization dictated by its associated authorization rules, but once the fare is over, FHV meter 100 will not engage again until FHV Meter 100 returns to a state that complies with its authorization rules. For example, the authorization rules may only permit FHV Meter 100 to accept fares between 6 PM and 6 AM. If a passenger wishes to hire a FHV at 5:30 am, the FHV meter will engage since 5:30 am is within its authorization rules. If the trip lasts until 6:13 am, the fare may be completed. Once the passenger is dropped off, FHV meter 100 will not engage again until 6 PM. In this way, the authorization rules, may be enforced automatically by checking expiration or exclusion restrictions when FHV Meter 100 is to be first engaged with a new fare. This may significantly decrease or even eliminate the need for active enforcement of medallions, certificates, permits or general regulations within a jurisdiction. As well, this will effectively mete out FHV services to areas and times that the regulatory agency has determined are in the best interests of the riding public.

Figure 5:
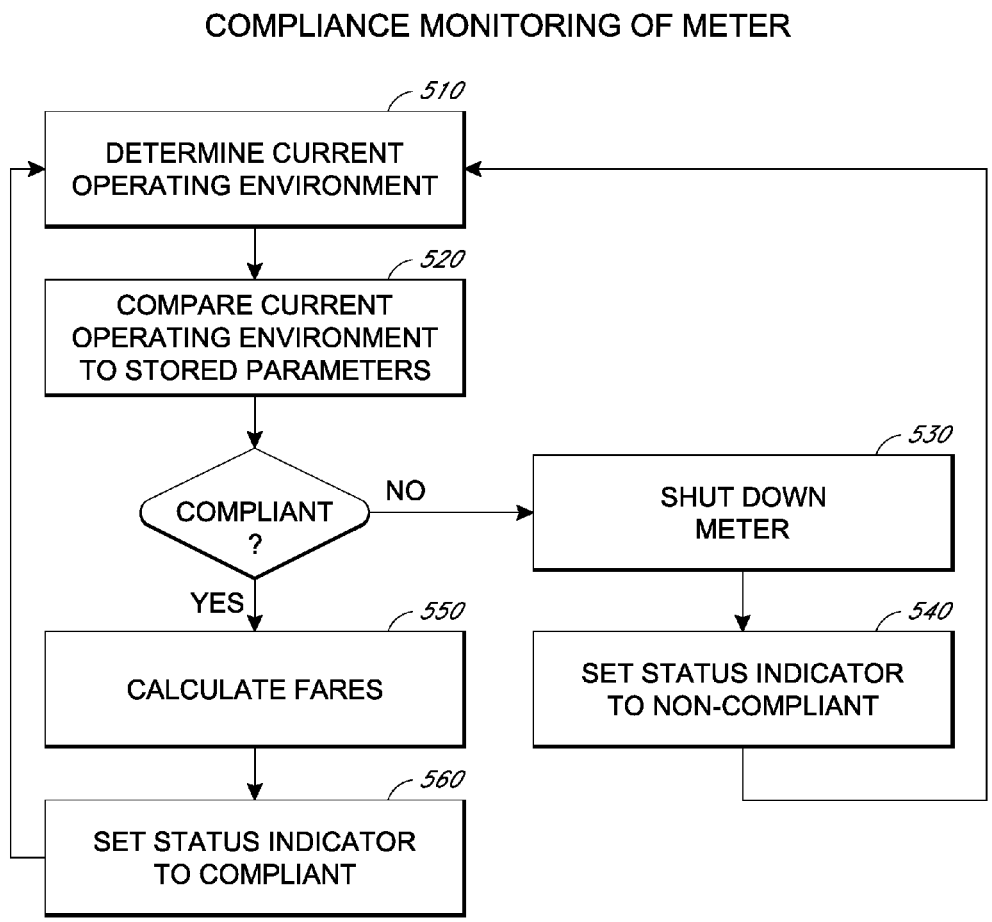
FIG. 5 is a flowchart showing the temporal flow of data for compliance monitoring of a FHV Meter.

FIG. 5 is a flowchart showing the temporal flow of data for determining how FHV meter 100 operates according to the expiration and exclusion parameters in one embodiment. Staring in box 510, FHV meter 100 determines its current operating environment or current state. The current operating environment may be the current date or time of FHV meter 100. CPU 310 may determine the current date or time by executing code stored in memory 315. The code may be, in some embodiments, a function call to the operating system of FHV meter 100 requesting the date of the system. It can be appreciated by those in the art that most operating systems, such as the operating systems described herein, comprise code for calculating the current date or time. The current date or time may also be determined from time/location data, such as GPS data, obtained from geospatial recognition module. In some embodiments the current data or time may be determined by external clock 207. In other embodiments, the current operating environment may be the current location of FHV meter 100. The current location may be determined, for example, by geospatial recognition module 350. In other embodiments, the current location may be determined by external location sensor 208. In other embodiments, the current operating environment may be a combination of the current time and the current location of FHV meter 100. FHV Meter 100 may also determine its current operating environment by advantageously accessing sensor data from one or more sensors attached to FHV meter 100 as shown, for example, in FIG. 2. It can be understood by those skilled in the art that the sensors may be external, as in FIG. 2, or may be internal sensors, such as geospatial recognition module 350.

Continuing to box 520, FHV meter 100 then compares the current operating environment determined in box 510 with the authorization rules stores as parameters in encrypted parameters data store 380. In some embodiments, if no authorization rules are stored in encrypted parameters data store 380, FHV meter 100 will not calculate fares. The authorization may be, as described above, values that correspond to the scope of operation of the FHV to which FHV meter 100 is attached granted by the regulatory agency through a combination of a medallion, a certificate, a permit and general regulations. For example, the operating parameters may include temporal boundary conditions such as a start date of operation (May 1, 2011) and an end date of operation (Apr. 30, 2012). In another embodiment, the operation parameters may include geospatial boundary conditions that describe a sub-region of operation for the FHV. CPU 310 may extract the boundary conditions from encrypted parameters data store 380. Also, as described with respect to FIG. 4, in some embodiments, FHV Meter 100 may decrypt the stored operating parameters before comparing the current operating environment to the stored parameters.

At box 520, FHV Meter 100 determines if the current operating environment is complaint with the expiration or exclusion parameters stored in encrypted parameters data store 380. For example, if the boundary conditions are temporal, they may define a start date of May 1, 2011 and an end date of Apr. 30, 2012. FHV meter 100 may determine the current operating environment in box 510 to be the date of Dec. 12, 2011. In this case, the current operating environment falls within the boundary conditions, and the process continues to box 850. If however, FHV meter 100 determines the current operating environment in box 510 to be the date May 30, 2012, the process will flow to box 530 because the current operating environment is not within the boundary conditions.

In box 530, FHV meter 100 shuts down if the current operating environment does not fall within the boundary conditions. In some embodiments, shut down may cause FHV meter 100 to cease operation and enter a stand-by or power down mode. In other embodiments, FHV meter 100 may continue to operate, however, it may not calculate fares. In some embodiments, at box 540 FHV meter 100 may also provide a status indicator such as status indicator 150, signaling that the FHV to which FHV meter 100 is attached is not in service. The status indicator may be color coded, that is, it may indicate a first color when FHV Meter 100 is in compliance and it may indicate a second color when FHV Meter 100 is non-complaint. In other embodiments, status indicator 310 may display a first message such as "FOR HIRE" when FHV Meter 100 is complaint, or it may display a second message such as "THIS VEHICLE CANNOT LEGALLY ACCEPT FARES" when it is non-compliant. Messages may be advantageous to advise passengers as to which FHVs are operating legally and which are not. In some embodiments, the status indicator may produce an audible sound, such as a beep or recorded message when FHV Meter 100 is non-compliant. In some embodiments, FHV meter 100 may generate an alert message and send it to parameter maintenance computer system 600, or a computer system operated by the owner or operator of the FHV, so that the regulatory agency, owner, or operator may be alerted as to an out of compliant meter. In box 550, FHV meter 100 calculates fares, or capable of accepting fares, if the comparison of the current operating environment and the stored parameters indicate that FHV meter 100 is complaint. Once compliant, FHV meter 100 may set the status indicator providing an indication that FHV meter 100 may accept new fares, or is currently operating in compliance as described above.

Advantageously, the temporal flow of data shown in FIG. 5 is performed regularly, that is, continuously or periodically. Since the flow of data depends on the current operating environment detected at box 510, and the current operating environment changes based on time of day, the location of the FHV, or other conditions, it is advantageous for the temporal flow to be performed often. The frequency of the performance of the steps may vary from embodiment to embodiment. In some embodiments, the process may be performed continuously, that is, without any predetermined amount of time between iterations. In other embodiments, it may be performed every second, every minute, every five minutes, or any other frequency one skilled in the art would deem appropriate given the computing resources of FHV meter 100.

Figure 6:
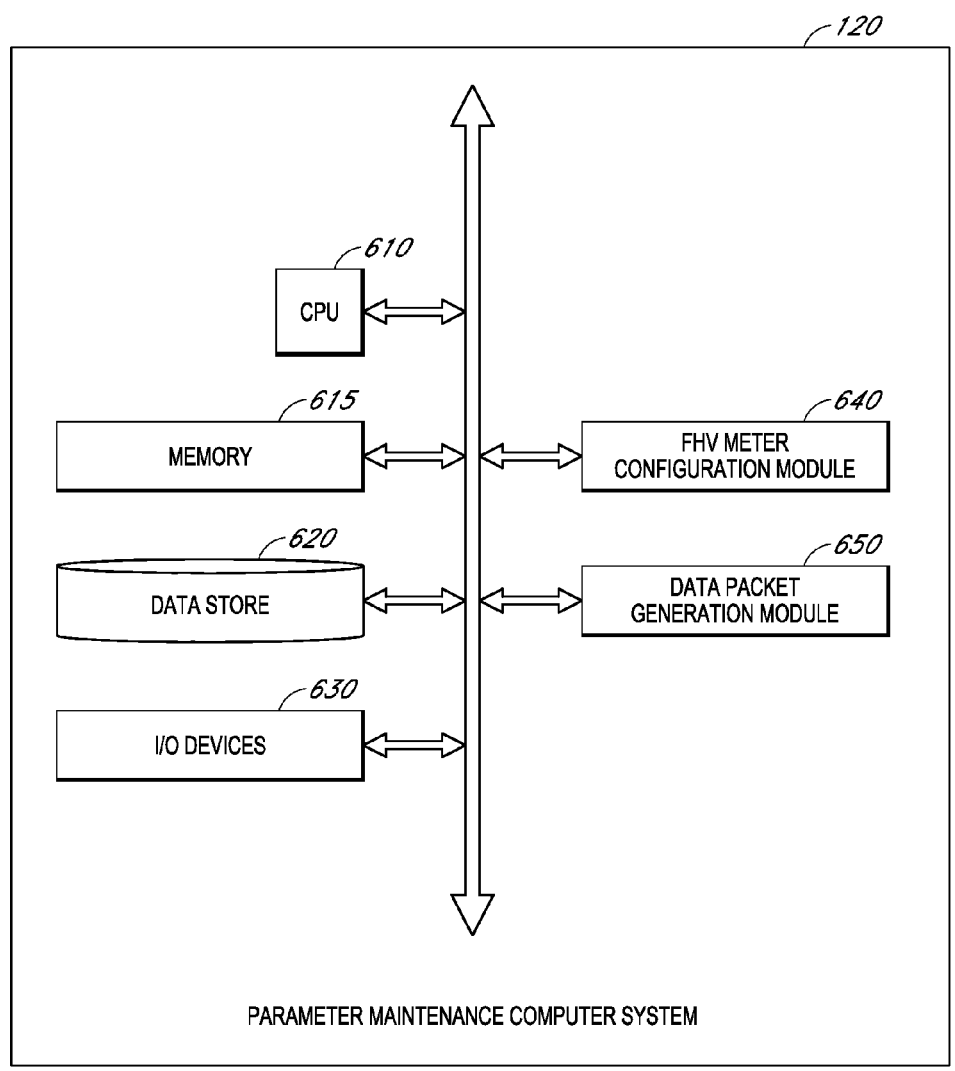
FIG. 6 is a block diagram showing one embodiment of a parameter maintenance computer system.

FIG. 6 is a block diagram of one embodiment of parameter maintenance computer system 600. Parameter maintenance computer system 600 may be a computer system responsible for the maintenance of expiration or exclusion parameters ("operating parameters" or "FHV parameters") and packaging them in a manner that FHV Meters 100 can interpret. Parameter maintenance computer system 600 may be a computer system operated by an entity responsible for the regulation of for-hire vehicles. For example, parameter maintenance computer system 600 may be operated by New York City Taxi and Limousine Commission or the State of Nevada Taxicab Authority. In another embodiment, parameter maintenance computer system 600 may be operated by a company that operates a fleet of for-hire vehicles ("FHVs"). The company may operate in a jurisdiction that allows the update of for-hire vehicles by fleet companies as opposed to a regulatory agency.

Figure 7:
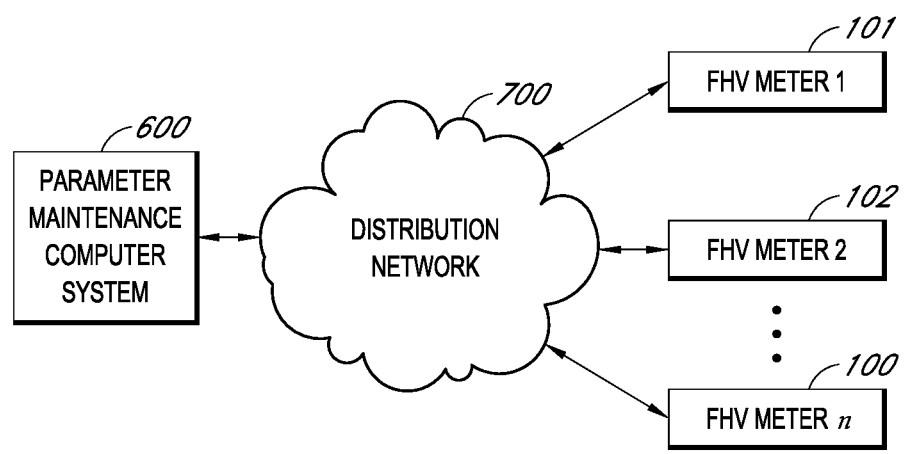
FIG. 7 is a block diagram showing one embodiment of a parameter maintenance computer system in communication with more than one for-hire vehicle meter.

In one embodiment, parameter maintenance computer system 600 is configured to interface with multiple devices, such as shown in the exemplary network of FIG. 7. Parameter maintenance computer system 600 may be used to implement certain systems and methods described herein. The functionality provided for in the components and modules of parameter maintenance computer system 600 may be combined into fewer components and modules, or further separated into additional components and modules.

In one embodiment, parameter maintenance computer system 600 includes, for example, a server or a personal computer that is IBM, Macintosh, or Linux/Unix compatible. In another embodiment, parameter maintenance computer system 600 comprises a laptop computer, smart phone, personal digital assistant, or other computing device, for example. In one embodiment, the exemplary parameter maintenance computer system 600 includes one or more central processing units ("CPU") 610, which may include one or more conventional or proprietary microprocessors. Parameter maintenance computer system 600 further includes a memory 615, such as random access memory ("RAM") for temporary, storage of information and a read only memory ("ROM") for permanent storage of information, and a data store 620, such as a hard drive, diskette, or optical media storage device. In certain embodiments, data store 620 stores FHV meter data and one or more sets of FHV operating parameter data. Embodiments of data store 620 may store data in databases, flat files, spreadsheets, or any other data structure known in the art. Typically, the modules of parameter maintenance computer system 600 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, parameter maintenance computer system 600 leverages computing and storage services available over the Internet (cloud computing).

Parameter maintenance computer system 600 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, parameter maintenance computer system 600 may be controlled by a proprietary operating system. Advantageously, the operating system of parameter maintenance computer system 600 is capable of generating secure, encrypted data packets of expiration and exclusion parameters as described herein. In addition, the operating system of parameter maintenance computer system 600 is advantageously compatible with FHV meters so that one may program a FHV meter using parameter maintenance computer system 600. Conventional operating systems control and schedule computer processes for execution, perform memory management, provide file system, networking, and I/O services, and provide a user interface, such as a graphical user interface ("GUI"), among other things.

The exemplary parameter maintenance computer system 600 may include one or more commonly available input/output (I/O) interfaces and devices 630, such as a keyboard, mouse, touchpad, and printer. In one embodiment, the I/O devices and interfaces 630 include one or more display devices, such as a monitor, that allows the visual presentation of data to a user. More particularly, a display device provides for the presentation of GUIs, application software data, and multimedia presentations, for example. In the embodiment of FIG. 4, the I/O devices and interfaces 630 provide a communication interface to various external devices. For example, in this embodiment parameter maintenance computer system 600 is in communication with distribution network 700, such as any combination of one or more LANs, WANs, or the Internet, for example, via a wired, wireless, or combination of wired and wireless, connections via a network interface of the I/O devices and interfaces 630.

In the embodiment of FIG. 6, parameter maintenance computer system 600 also includes several application modules that may be executed by CPU 610. The software code of the modules may be stored on a non-transitory computer-readable medium such as for example, RAM or ROM. More particularly, the application modules include FHV configuration module 640 and data packet generation module 650. In some embodiments, parameter maintenance computer system 600 may be operated by a regulatory agency, or in some embodiments, by a FHV fleet operator under the supervision of a regulatory agency. Parameter maintenance computer system 600 may, in some embodiments, be secured via a username and password. In other embodiments, parameter maintenance computer system 600 may be located in physically secure location such that only authorized personnel may access parameter maintenance computer system 600.

In one embodiment, FHV configuration module 640 may comprise software code executable by CPU 610 that handles the configuration of for-hire vehicles. In some embodiments, configuration of for-hire vehicles ("FHVs") is done through the creation and modification of FHV operating parameters. In some embodiments, the FHV operating parameters may be defined as indicated above. In some embodiments, FHV operating parameters may be defined and modified through the use of a user interface generated by FHV configuration module 640. FHV configuration module 640 may generate a user interface and present it to a user of parameter maintenance computer system 600 so that the user may assign values to various FHV parameters. Once a user defines the parameters, they may be stored to data store 620 or they may be sent to data packet generation module 650. The user interfaces may also allow for the assignment of a driver to a FHV or FHV meter and the entry of the authorization rules associated with the permit into parameter maintenance computer system 600.

In one embodiment, data packet generation module 650 may comprise software code executable by CPU 610 that handles the generation of data packets that may be deployed via distribution network 700 to FHV meters such as FHV meter 100. The generation of the data packet is advantageously in a format the FHV meter can interpret. For example, the data packet may be an XML file, text file, serialized object, COM object, byte stream, or any other data format known in the art. The data packet generation module 650 may generate a data packet unique to the target FHV meter. In other embodiments, data packet generation module 650 may generate a data packet that may be used by several different FHV meters.

FIG. 7 is a block diagram showing one embodiment of parameter maintenance computer system 600 in communication with more than one for-hire vehicle ("FHV") meter (100, 101, 102). In general, FHV parameters, as indicated above, are values defining the operation of for-hire vehicles. FHV parameters may include operating parameters corresponding to authorization rules, or they may correspond to the fare rules that FHV Meter 100 uses in order to calculate fares for passengers. A set of FHV parameters may be stored in FHV Meters associated with a FHV, such as FHV Meter 100, 101 and 102. In general, FHV parameters are configurable and may change over time. Regulatory bodies may set regulations dictating the terms by which for-hire vehicles ("FHVs") may operate, and FHV parameters may be stored in FHV Meter 100 reflecting those terms. The regulatory bodies may change the regulations, in some cases temporarily, compared to when the FHV Meter was installed on its associated FHV. Accordingly, the FHV parameters stored on the FHV Meters 100, 101 and 102 require updating from time to time.

In one embodiment, the FHV parameters may be distributed over distribution network 700. Distribution network 700 may be, in some embodiments, a computer network. Depending on the embodiment, distribution network 700 may comprise one or more of any type of network, such as one or more local area networks, wide area networks, personal area networks, telephone network, and/or the Internet, which may be accessed via any available wired and/or wireless communication protocols. Thus, distribution network 700 may comprise a secure LAN through which FHV Meter 100 and parameter maintenance computer system 600 may communicate, and distribution network 700 may further comprise an Internet connection through which FHV Meter 100 and parameter maintenance computer system 600 communicate. Any other combination of networks, including secured and unsecured network communication links, are contemplated for use in the systems described herein.

In another embodiment, distribution network 700 may utilize manpower and non-transitory tangible computer readable media to distribute FHV parameters from parameter maintenance system 600 to FHV Meter 100. For example, parameter maintenance system 600 may write the FHV parameters to a portable non-transitory computer medium such as a floppy disk, USB flash drive, memory card, portable hard drive, etc. A person may then distribute the FHV parameters to FHV Meters 100, 101 and 102 by physically connecting the computer medium to each FHV Meter in the network.

Once connected, FHV Meter 100 may then read the FHV parameters from the computer medium and configure itself accordingly.

Figure 8:
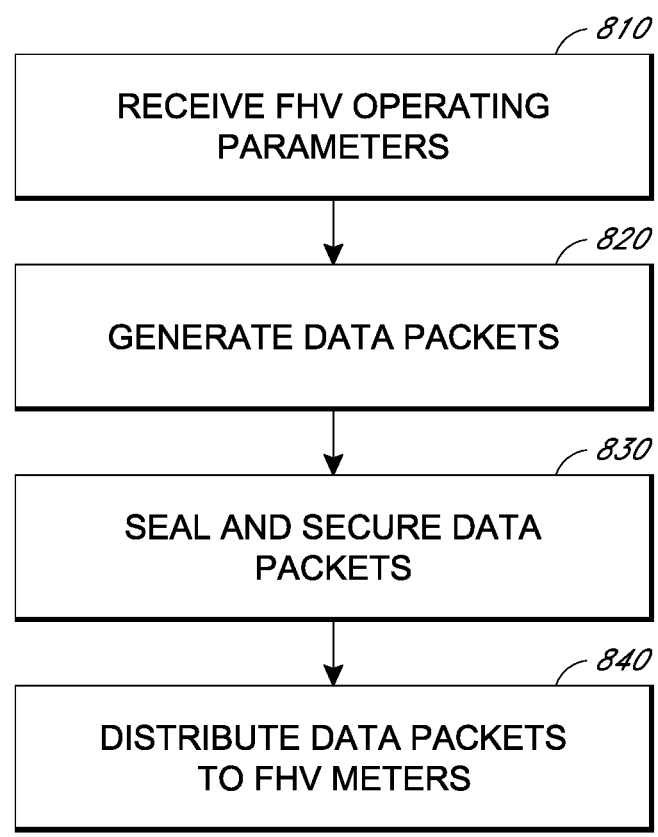
FIG. 8 is a flowchart showing the temporal flow of data for generating a secure data packet of for-hire vehicle parameters in one embodiment of a parameter maintenance computer system.

FIG. 8 shows the temporal flow of data for generating secure data packets for FHV parameters in one embodiment of parameter maintenance computer system 600. First, in box 810, parameter maintenance computer system 600 receives FHV operating parameters. In general, the FHV operating parameters may be defined by a regulatory agency that controls and regulates for-hire vehicles ("FHVs") and may correspond to the authorization rules for FHVs that result from the restrictions placed on their operation by medallions, certificates, permits and general regulations. The operating parameters may be received by parameter maintenance computer system 600 through the use of a user interface generated by FHV configuration module 640. In some embodiments, once parameter maintenance computer system 600 receives the FHV parameters, it may store them in data store 620.

Next, in box 820 parameter maintenance computer system 600 generates data packets for distribution or deployment to FHV Meter 100. The data packets generated by parameter maintenance computer system 600 may contain the FHV operating parameters received in box 810. In one embodiment, several FHV parameters are included in a data packet. A data packet may be, in some embodiments, the group of FHV operating parameters that are to be distributed to a particular FHV Meter. In one embodiment, parameter maintenance computer system 600 may generate a different data packet for each FHV Meter in distribution network 700. In other embodiments, it may generate a data packet for more than one FHV Meter in the distribution network. In such embodiments, the FHV Meters of distribution network 700 may share the same private key for decryption purposes.

In one embodiment, each generated data packet contains a header. The header may contain metadata used by FHV Meters in distribution network 700 containing a unique identifier corresponding to the FHV Meter that should read the data packet. For example, if parameter maintenance computer system 600 generates a data packet for FHV Meter 123456578, the data packet might contain metadata indicating that the data packet is for FHV Meter 12345678. The metadata of the header may be configured to match the unique identifier scheme of the FHV Meters in distribution network 700.

In some embodiments, the data packet may be generated by parameter maintenance computer system 600 as an XML file. The root node of the XML file may correspond to metadata. For example, the root node may contain the unique identifier of the FHV Meter for which the data packet was generated. The first child nodes of the root node ("second level nodes") may correspond to one or more group-FHV operating parameters. The second level nodes may, for example, define the validity duration of a group of FHV operating parameters, or in other embodiments, geospatial validity of a group of FHV operating parameters. The second level nodes may correspond to authorization rules associated with the FHV. Second level nodes may also correspond to, in other embodiments, FHV operating parameters associated with general regulations such as, for example, maximum speed, maximum sound level, temperature boundary values, and smoke detection preferences. The child nodes of the second level nodes ("third level nodes") may contain FHV operating parameters such as time and distance-traveled parameters, geospatial point parameters, variable operating cost surcharge parameters, fare initiation parameters or fare termination parameters. In other embodiments, the data packet may be generated as a text file, serialized object, data stream, or any other data format known in the art suitable for transferring data between computer systems. In some embodiments, the data packet may not be hierarchal, but instead defined in a flat structure with a series of name-value pairs indicating the various FHV parameters and their associated values.

In box 830, parameter maintenance computer system 600 seals and secures the data packets generated in box 820. In one embodiment, parameter maintenance computer system 600 seals and secures the data packets using an asymmetrical encryption means such as public-private key encryption. In such embodiments, parameter maintenance computer system 600 may encrypt the data packet based on a public key associated with FHV Meter 100. In some embodiments, the public key of FHV Meter 100 may be unique to the FHV Meter. For example, FHV Meter with serial number 123 may have a different public key than FHV Meter with serial number 987. In other embodiments, the public key for more than one FHV Meter may be the same. For example, all of the FHV Meters of a particular manufacturer, or for a particular for-hire vehicle fleet operator, may share the same public key. Parameter maintenance computer system 600 may seal and secure the data packets by using a standard encryption algorithm such as for example, Data Encryption Standard (DES), Advanced Encryption Standard (ADS), Pretty Good Privacy (PGP), International Data Encryption Algorithm (IDEA), Blowfish, RC5, CAST, etc. One skilled in the art can appreciate that any encryption algorithm may be used to seal and secure the data packets generated by parameter maintenance computer system 600.

Moving to box 840, once the data packet has been sealed and secured, it may be distributed to FHV Meters in distribution network 700. The distribution of packets may vary depending on the embodiment. For example, in one embodiment data packets may be transferred to a portable non-transient computer readable medium such as CD-ROM, diskette, or USB flash drive. In such an embodiment, an individual under a regulatory agency's authority supervision and control may manually load the sealed and secure data packets to each FHV Meter. In some embodiments, one medium may be generated for each FHV Meter. This may occur in embodiments where the FHV Meter is dedicated computer system. For example, in some embodiments, a data packet may be loaded onto a plurality of USB flash drives, each of the USB flash drives corresponding to one of the FHV Meters in distribution network 700. An agent of the regulatory agency may insert the USB flash drive into the USB port of the FHV Meter intended to be loaded with the data packet stored on the USB flash drive. In such embodiments, the USB flash drive may act as a USB Dongle, that is, the FHV Meter may only operate when the USB flash drive is inserted into the FHV Meter. The agent may then seal the USB Dongle to the FHV Meter using a visual indicator of tampering such as color coded self destructible tape, special plastic tie, special metal tie, or seal. The visual indicator may then act as evidence of tampering; if the visual indicator is broken, it will serve as an indication that the USB Dongle may have been tampered with.

In other embodiments, distribution of sealed and secure data packets may occur over a wireless network. In such embodiments, each FHV Meter in distribution network 700 may have a wireless receiver capable of receiving a wireless network signal. Parameter maintenance computer system 600 may broadcast, on a periodic basis, data packets for various FHV Meters. In some embodiments, the FHV Meters may listen for all data packets broadcast by parameter maintenance computer system 600. Using the header information of the data packet, the FHV Meter may then determine if the data packet should be used to update its parameters by comparing the unique identifier information of the data packet to the unique identifier information stored in general data store 320. In other embodiments, FHV Meter 100 may be programmed to listen for its packet at a particular time, such as the same time every day or week. For example, FHV Meter 100 may be programmed to listen for its data packet every day at noon, or may be programmed to listen for its data packet at 2 PM every seven days. In such embodiments, parameter maintenance computer system 600 advantageously broadcasts the data packet at the specific time. In some embodiments, parameter maintenance computer system 600 may only wirelessly broadcast data packets in a specific location such as the garage where the FHV is stored, thus limiting the secure, encrypted data packet's exposure to interception and fraud.

In other embodiments, FHV Meters may run server software, such as a telnet server, socket server, or any other means of communicating over a TCP port that allows for communications with parameter maintenance computer system 600. In such embodiments, the FHV Meters of distribution network 700 may be assigned a dedicated IP address. Parameter maintenance computer system 600 may store, in data store 320, the IP address, the unique identifier, and in some embodiments the public key, associated with FHV Meter 100. The stored data may then be used to distribute the data packet to a specific FHV Meter such as FHV Meter 100. For example, parameter maintenance computer system 600 may generate a data packet and include in the header the unique identifier of FHV Meter 100. After the data packet is generated, parameter maintenance computer system 600 may seal the data packet according to the public key. Then, parameter maintenance computer system 600 may use the IP address of the FHV Meter to start a session with the FHV Meter and open a port for communication. Parameter maintenance computer system 600 may then transfer the data packet directly to its intended target FHV Meter.

In other embodiments, FHV Meter 100 may pull data packets from parameter maintenance computer system 600 as opposed to parameter maintenance computer system 600 pushing data packets to FHV Meter 100. For example, FHV Meter 100 may, via a wireless connection, poll parameter maintenance computer system 600 on a periodic basis to determine if any data packets have been generated since the last request. The request may include, for example, the unique identifier of the FHV Meter. Parameter maintenance computer system 600 may respond to the request by sending a data packet corresponding to the unique identifier of the FHV Meter. In some embodiments, parameter maintenance computer system 600 may respond with a null message, or a message indicating no data packets were generated since the last request. In some embodiments, FHV Meter 100 may make an update request daily, every other day, or weekly. In some embodiments, the FHV Meters within distribution network 700 may be configured to make update requests at different points during an update period so that network traffic is minimized. For example, FHV Meter 100 may make an update request daily at 9 AM, FHV Meter 101 may make an update request daily at 10 AM, and FHV Meter 102 may make an update request at daily 11 AM.

Figure 9:
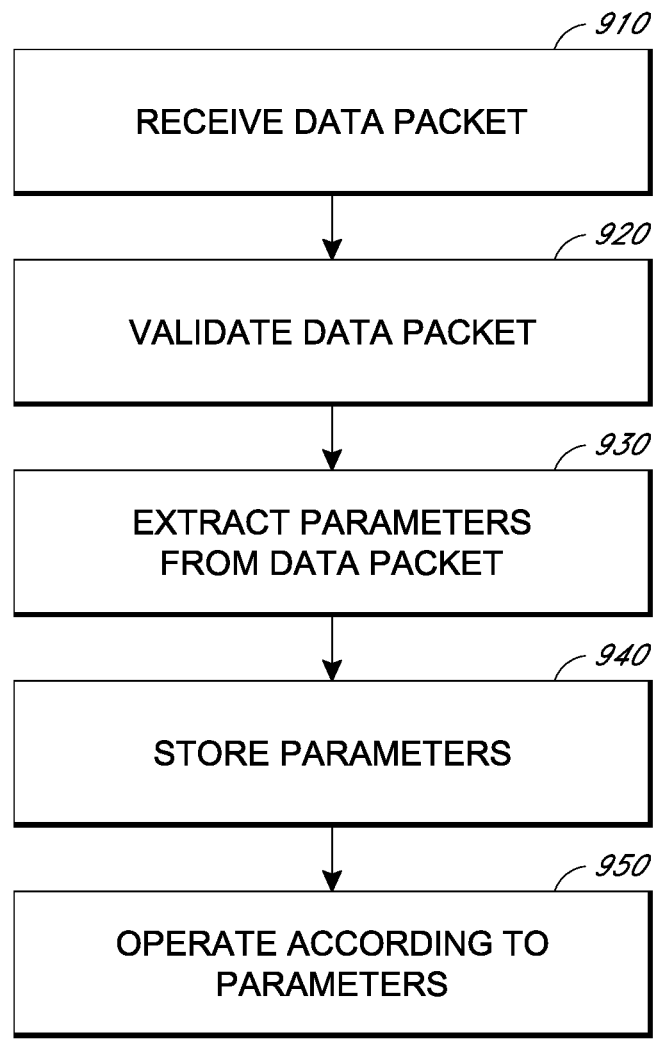
FIG. 9 is a flowchart showing the temporal flow of data for processing a secure data packet in one embodiment of a for-hire vehicle meter.

The distribution methods of sealed and secured data packets described herein with reference to box 840 are meant as examples and should not be interpreted as the sole means for distributing data packets within distribution network 700. It can be appreciated that the distribution of data between the systems of distribution network 700 may vary according to the needs and limitations of the particular embodiment and the distribution methods described herein may be tailored to satisfy the needs, and work within the limitations, of any particular distribution network.

FIG. 9 is a flowchart showing the temporal flow of data for processing a secure data packet in one embodiment of FHV Meter 100. Starting in box 910, FHV Meter 100 receives a data packet containing FHV operating parameters, which advantageously includes the expiration and exclusion parameters associated with the FHV or FHV Meter 100. As described above, there are numerous means for receiving the data packet, including but not limited to, receipt from a computer medium directly connected to the FHV Meter and receipt of the data packet via a wireless receiver. Once the data packet has been received, FHV Meter must process the data packet.

Processing begins, in one embodiment, by validating the data packet in box 620. Validation of data packets may start, in one embodiment, by examining the metadata header of the data packet for a value representing the unique identifier of the data packet's target FHV Meter. If the data packet contains a unique identifier not matching the unique identifier of FHV Meter 100, processing stops and the data packet may be discarded, or deleted, from memory 315. If the data packet contains a unique identifier matching the unique identifier of FHV Meter 100, FHV Meter 100 may continue to validate the packet by decrypting it. In other embodiments, the data packet does not contain a metadata header, or the metadata header may not include a unique identifier. In such embodiments, the validation process may begin by FHV Meter 100 attempting to decrypt the data packet. For example, cipher engine module 370 may attempt to decrypt the data packet using private key 360. Once decrypted, FHV Meter 100 may attempt extract operating parameters from the data packet. If FHV Meter 100 cannot extract usable operating parameters from the data packet, then the data packet fails validation. In such embodiments, the data packet may then be discarded, or deleted from RAM. In some embodiments, if the data packet fails validation, FHV Meter 100 may shut down or not become first engaged until it receives a data packet it may validate.

Once the packet has been validated, FHV Meter 100 extracts operating parameters from the data packet in box 630 if it has not already done so during the validation step. The extraction of operating parameters depends on the embodiment. For example, if the data packet was generated as an XML file, FHV Meter 100 may analyze the XML file to determine the FHV operating parameters. In other embodiments, if the data packet is a serialized object, FHV Meter 100 may deserialize the object, and then extract the FHV parameters using the object's interface. In other embodiments, the data packet may be implement as a byte stream, in which case, FHV Meter 100 may parse the byte stream in order to determine the operating parameters.

In box 940, once the operating parameters have been extracted, they may be stored in encrypted parameters data store 380. In box 950, the stored operating parameters may be accessed by CPU 310 in order to determine the operation of FHV Meter 100 as described above with respect to FIGS. 4 and 5. In other embodiments, the operating parameters are stored in the secure encrypted data packet form and are decrypted by cipher engine module 370 as needed. In such embodiments, CPU 310 may request cipher engine module 370 to decrypt the packet and return the expiration and exclusion parameters associated with the FHV Meter.

Autonomous Vehicles

In some embodiments, FHV 190 may be an autonomous vehicle. An autonomous vehicle is a vehicle that drives itself without direct human intervention. An autonomous vehicle may use artificial intelligence, sensors and GPS to coordinate and operate itself without active intervention by a human operator. Google and Volkswagen are two companies that have developed technology related autonomous vehicles. Although autonomous vehicles do not necessarily need a human "driver", many embodiments allow for an operator to override the auto-driving features for safety reasons.

An autonomous FHV may include embedded within its computer system the modules of FHV Meter 100 as depicted in FIG. 1 and FIG. 3, such as cipher engine module 370 and encrypted parameters data store 380. The modules may advantageously communicate with the control system modules ("control system") of the autonomous FHV to command the autonomous FHV to a particular location or to command the autonomous FHV to shut down or cease operations or to instruct the autonomous FHV to take other action within the scope of actions permitted by the autonomous vehicle control system. This interface with the control system may advantageously operate to permit the FHV meter modules, for example, to communicate control system modules of the autonomous vehicle over an application program interface ("API") of the autonomous FHV's control system allowing external commands to be sent to the autonomous vehicle control system. The API, for example, may expose simple commands such as a stop command, or it may expose a "go-to location" command allowing external modules to issue a command to the autonomous FHV to go to a particular location. For example, as described below, FHV Meter 100 may be programmed with a home location parameter or a dispatch location parameter. When FHV Meter 100 detects an environmental condition that would indicate a need to return to the dispatch location, it may send a "go-to location" command to the control system of the autonomous FHV with data indicating the FHV's dispatch location (such as, for example, the GPS coordinate of the dispatch location). Those skilled in the art will appreciate that FHV Meter 100 may utilize additional commands exposed by the control system of the autonomous FHV in order to implement the methods described herein.

In embodiments where the modules of FHV Meter 100 are embedded within the autonomous FHV, the autonomous FHV may have controls for an operator or passenger to engage a fare, end a fare, or enter a destination. For example, the autonomous FHV may include a user interface similar to the front view of FHV Meter 100 illustrated in FIG. 1.

In other embodiments, FHV Meter 100 may be a separate unit that attaches and interfaces with the control system of the autonomous FHV. The separate unit may connect with the autonomous FHV using any means known in the art for connecting two computer systems. For example, FHV Meter 100 may connect to the control system via a USB port, a RS 232 port, wireless port, or Bluetooth. The placement of FHV Meter 100 within the autonomous FHV may vary depending on the intended operator. For example, an autonomous FHV may include a meter that has a front view similar to the front view depicted in FIG. 1. In some embodiments, an operator may press the "START" button to first engage a fare when picking up a passenger. In such embodiments, FHV meter 100 may be near the front seat of the autonomous FHV, In other embodiments, the passenger may press the "START" button (or similar button) to start a fare. In addition to starting a fare, an autonomous FHV may include an input device that allows a passenger or operator to input a destination. For example a street address or GPS coordinate could be used. In some embodiments, the FHV meter may also have a touch-screen display with icons showing common destinations which the passenger may touch to select a destination. Once the destination is inputted, FHV Meter 100 may issue a "go-to location" command to the control system. The autonomous FHV may then continue on to selected destination once it registers the passenger's selection.

The use of autonomous FHVs advantageously allows a regulatory agency to permit more FHVs to be available to the public without the need to grant additional permits to drivers. Furthermore, autonomous FHVs provide the regulatory agency with a means of directly controlling the operation of the FHV. For example, if a regulatory agency wishes to have the autonomous FHV only operate on weekends, then it may program the autonomous vehicle not to leave its dispatch location until the weekend. A regulatory agency may enforce location based restrictions, such as those associated with a certificate or medallion authorization, by not allowing the autonomous FHV to travel to locations outside its permitted authority to engage passenger fares. Regulatory agencies may directly control autonomous FHVs through the use of FHV parameters, such as those described above.

In some embodiments, it may be desirable to only allow FHVs to pick up passengers from designated locations. For example, in some jurisdictions, FHVs are not permitted to pick up passengers that hail the FHV. The FHV may only engage new fares at a designated post, stand or taxi-stop. Pick-up posts, stands, and taxi-stops may be located along the side of a road (similar to a bus stop) or they may be located at a particular landmark such as an airport, train station or bus depot, where demand for FHVs may be high.

Advantageously, regulatory agencies may create a FHV parameter for autonomous FHVs that defines the autonomous FHV's home location. The home location may also be established by the owner of the FHV. The home location of an autonomous FHV is the location where it is permitted to engage passenger fares. For example, an autonomous FHV may only be allowed to pick up passenger at the airport, hotels, or at a particular intersection. Once the FHV engages a fare, it may then transport the passenger to the location selected by the passenger. Once the passenger leaves, the FHV may not, in this embodiment, engage an additional fare until it returns to its home location. The FHV parameter defining the home location may include a geospatial point that uniquely identifies it. The geospatial point may be formatted as a geodetic coordinate such a latitude and longitude coordinate, Earth-Centered, Earth-Fixed Cartesian (ECEF) coordinate (ECEF), Universal Transverse Mercator (UTM) coordinate, Military Grid Reference System (MGRS) coordinate, World Geographic Reference System (GEOREF) coordinate, etc. The geospatial point may, in some embodiments, be defined in a format such as an XML object or data object. In other embodiments, the geospatial point may be defined as a string, or numeric value, if appropriate, or any other format for conveying position information among computer systems known in the art.

In addition to the home location, it may be advantageous for regulatory agencies or the owners of FHVs to also define a FHV parameter indicating the autonomous FHV's dispatch location. A dispatch location may be the location where the autonomous FHV is stored when it is not in operation. For example, if an autonomous FHV only operates on weekends, it may be parked and stored at its dispatch location on weekdays. The FHV parameter defining the dispatch location may include a geospatial point that uniquely identifies it. The geospatial point may be formatted as a geodetic coordinate such a latitude and longitude coordinate, Earth-Centered, Earth-Fixed Cartesian (ECEF) coordinate (ECEF), Universal Transverse Mercator (UTM) coordinate, Military Grid Reference System (MGRS) coordinate, World Geographic Reference System (GEOREF) coordinate, etc. The geospatial point may, in some embodiments, be defined in a format such as an XML object or data object. In other embodiments, the geospatial point may be defined as a string, or numeric value, if appropriate, or any other format for conveying position information among computer systems known in the art.

In other embodiments, instead of the use of a home location, an autonomous FHV may be allowed to engage passenger fares within a geographic polygon corresponding to the area of operation authorized by the autonomous FHV's medallion or certificate. The geographic polygon may be defined by a set of geospatial points defining the boundaries of the authorization. In such embodiments, the autonomous FHV may engage a new passenger fare anywhere inside the polygon. The FHV parameters may be defined as noted above with reference to FIG. 1.

In operation, parameter maintenance computer system 600 may accept from a user (under the direction of the regulatory agency) data that defines a set of FHV parameters corresponding to the autonomous FHV's authorization to operate within the regulatory agency's jurisdiction of control. The FHV parameters may include, for example, the authority to accept passenger fares in a certain geographic region, the times the autonomous FHV may accept passenger fares, as well as home location or dispatch location parameters. Once the user inputs the data (which may be via user interface, import file, or any other means of inputting data known by those skilled in the art), parameter maintenance computer system 600 may create a secure, encrypted data packet which is then delivered to the autonomous FHV as described above with respect to FIGS. 6-8.

Once the autonomous FHV receives the secure, encrypted data packet, it may then store it encrypted parameters data store and extract the data within the packet as described above with respect to FIG. 9. The autonomous FHV may then operate according to the parameters defined within the data packet.

In embodiments where the FHV parameters define a home location value, the autonomous FHV may only accept passenger fares at the home location. At the start of the time span when the autonomous FHV may accept passengers, the autonomous FHV may drive itself to the home location. The home location may be, for example, a designated passenger pick-up point along a highway or street, or it may be an airport, train station, bus depot or other landmark. Once the autonomous FHV arrives at the home location, it will notify potential passengers that it may accept fares. In some embodiments, this may be done by illuminating status indicator 150. When a passenger wishes to engage the FHV for a fare, status indicator 150 may change to indicate it is no longer for hire, but instead, is carrying a passenger. The autonomous FHV may then proceed to drive itself to the passenger's selected location. Once the passenger's fare is completed, the autonomous FHV may then check the current time to ensure that is still able to operate according to the FHV parameters stored in encrypted parameters data store 380. If the current time falls inside the boundaries of its time based FHV parameters, the autonomous FHV may then return to its home location, or closest pick-up location permitted, to await another passenger fare. It may not accept another fare until it returns to its home location or other permitted pick up location. If the current time falls outside the boundaries of its time based FHV parameters, the autonomous FHV may return to its dispatch location.

As the autonomous FHV operates it may constantly monitor the current time to ensure that it is still operating within the scope of the authority granted to it by the regulatory agency. Autonomous FHV may periodically check the current time (as described above) and then compare that value to the FHV parameters stored within encrypted parameters data store. If the time value falls outside the time based FHV parameter boundary values, the FHV may then return to the dispatch location. In some embodiments, while the autonomous FHV is stored at the dispatch location, it may also periodically check the current time. Once the current time falls within the time based FHV parameter boundary values, it may then leave the dispatch location and drive itself to its home location and begin accepting passenger fares.

In one embodiment, FHV Meter 100 may interface with the control system of the autonomous FHV advantageously permitting FHV Meter 100 to command the autonomous FHV to perform the operating conditions described above. For example, if FHV Meter 100 determines that the FHV is not operating within the scope of the authority granted to it by the regulatory agency, FHV Meter 100 may issue a command to the control system of the autonomous vehicle to return to the home location or dispatch location. The command may be, for example, a "go-to location" command with data indicating the home or dispatch location. FHV Meter 100 may also issue a stop command or a shut-down command via the control systems API when the FHV is not operating within the scope of the FHV's authority.

In some embodiments, instead of a home location, the autonomous FHV may be permitted to accept passenger fares at any location permitted by its associated medallion or certificate. In such embodiments, autonomous FHV may advantageously "learn" the best spots for engaging new fares based on its past fare history. An autonomous FHV may create a record for every passenger fare engagement and store the record in general data store 320. After the autonomous FHV has collected a predetermined number of records, for example 100 records, autonomous FHV may check general data store 320 for entries that match the current time and then determine the most frequent passenger engagement locations and the highest fare locations. Once it determines the best location based on frequency of pick up or highest fares, it may drive itself to the location and await a passenger fare. For example, an autonomous FHV may have data records indicating that in the past, it has engaged more passenger fares at the airport on Friday night than at a large high-rise office building or hotel. Conversely, the autonomous FHV may have data records indicating that it has engaged more passenger fares at noon on Tuesday at the high-rise office building than at the airport. Accordingly, if the autonomous FHV drops a passenger off on Friday night, it may drive itself to the airport and await another engagement. If the autonomous FHV drops a passenger off on Tuesday close to noon, it may then drive itself over to the high-rise office building to await engagement of another passenger fare. This may be implemented using expert system software that is capable of learning the best location as well as delivery and pick-up optimization software that allocates the most effective path for an available autonomous FHV. Further, several FHVs could be coordinated using the expert system or optimization software.

All of the methods and tasks described herein may be performed and fully automated by a computer system. The computer system may in some cases include multiple distinct computers or computing devices (e.g., physical servers, workstations, storage arrays, etc.) that communicate and interoperate over a network to perform the described functions. Each such computing devices typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices such as solid state memory chips and/or magnetic disks, into a different state.

The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An on-board for-hire vehicle (FHV) management system comprising:
   one or more sensors for collecting sensor data relating to a for-hire vehicle; and
   a FHV meter configured to manage a passenger fare, comprising:
      a secure computer memory storing encrypted parameters associated with the operation of the for-hire vehicle, wherein the encrypted parameters comprise at least one authorization rule defining a scope of operation of the for-hire vehicle;
      a processor; and
      a non-transitory computer readable medium storing instructions that when executed cause the processor to:
         access the sensor data;
         determine, based on the sensor data, a current operating state of the for-hire vehicle;
         extract the encrypted parameters by accessing the secure computer memory and decrypting the encrypted parameters;
         compare the current operating state to the decrypted parameters to determine compliance with the at least one authorization rule; and
         at least partially prevent the FHV meter from initiating a course of action based at least in part on the comparison;
      wherein the processor is configured to compare the operating state to the extracted parameters while the FHV meter is disposed within the for-hire vehicle.

2. The system of claim 1, wherein the course of action comprises initiating the passenger fare in response to a request to initiate the passenger fare.

3. The system of claim 2, wherein the instructions further cause the FHV meter to provide a discernible notice that the passenger fare cannot be initiated.

4. The system of claim 3 wherein the discernible notice is displayed and visually ascertainable on the FHV meter.

5. The system of claim 3 wherein the discernible notice is aurally ascertainable.

6. The system of claim 1, wherein the sensor data comprises a current location of the for-hire vehicle.

7. The system of claim 1, wherein the sensor data comprises a current time.

8. The system of claim 1, wherein the sensor data comprises an interior temperature of the for-hire vehicle.

9. The system of claim 1, wherein the sensor data comprises an interior sound level of the for-hire vehicle.

10. The system of claim 1 wherein the operating parameters comprise time based operating restrictions.

11. The system of claim 1 wherein the operating parameters comprise location based operating restrictions.

12. The system of claim 1, wherein the FHV meter is configured to receive the operating parameters via an encrypted data packet.

13. The system of claim 12 wherein the instructions further cause the FHV meter to decrypt the encrypted data packet.

14. The system of claim 13 wherein the decryption instructions are stored on a tamper evident computer readable medium.

15. A method of enforcing regulations associated with a for-hire vehicle comprising:
providing, by an on-board for-hire vehicle (FHV) meter configured to manage a passenger fare, operating parameters corresponding to authorization rules of a regulatory agency, the authorization rules defining a scope of operation of the for-hire vehicle in which the FHV meter is located;
accessing, by the FHV meter, sensor data from one or more sensors comprising an indication of a current operating state of the for-hire vehicle;
comparing, by the FHV meter, the current operating state of the for-hire vehicle to the operating parameters while the FHV meter is disposed within the for-hire vehicle to determine compliance with the authorization rules; and
at least partially preventing the FHV meter from initiating a course of action based at least in part on a result of the comparing.

16. The method of claim 15, further comprising displaying a first status if the comparison of the current operating state of the for-hire vehicle with the operating parameters are compliant with the authorization rules and displaying a second status if the comparison of the current operating state of the for-hire vehicle with the operating parameters are not compliant with the authorization rules.

17. The method of claim 16, wherein displaying the first status comprises displaying a first color and displaying the second status comprises displaying a second color.

18. The method of claim 16, wherein displaying the first status comprises displaying a first set of characters and displaying the second status comprises displaying a second set of characters.

19. The method of claim 15, further comprising shutting down the for-hire vehicle meter based at least in part on a result of the comparing.

20. The method of claim 15, further comprising generating an alert message if the current operating state of the for-hire vehicle is not compliant with the authorization rules.

21. The method of claim 20, further comprising transmitting the alert message to a computer system operated by a regulatory agency.

22. The method of claim 20, further comprising transmitting the alert message to a computer system operated by an owner of the for-hire vehicle.

23. The method of claim 15, wherein the course of action is engaging passenger fares.

24. The method of claim 15, further comprising receiving the operating parameters via an encrypted data packet.

25. The method of claim 24, further comprising decrypting the encrypted data packet.

26. The method of claim 15, further comprising storing the operating parameters on a tamper-evident computer readable medium.

27. An on-board for-hire vehicle management system for managing calculation of transportation fares, the system comprising:
one or more sensors for collecting sensor data relating to a for-hire vehicle; and
a for-hire vehicle (FHV) meter configured to manage a passenger fare, comprising:
a processor; and
a non-transitory computer readable medium storing:
operating parameters corresponding to authorization rules of a regulatory agency, the authorization rules defining a scope of operation of the for-hire vehicle, and
software instructions that when executed cause the processor to:
access sensor data from the one or more sensors comprising an indication of a current operating state of the for-hire vehicle;
compare the current operating state of the for-hire vehicle to the operating parameters while the FHV meter is disposed within the for-hire vehicle to determine compliance with the authorization rules; and
prevent the FHV meter from initiating a course of action based at least in part on a result of the comparing.

28. The system of claim 27, wherein the for-hire vehicle is an autonomous vehicle, wherein the FHV meter is configured to command the for-hire vehicle using an interface between the meter and a control system of the autonomous vehicle.

29. The system of claim 28, wherein the operating parameters comprise a dispatch location.

30. The system of claim 29, wherein the software instructions further cause the processor to command the autonomous for-hire vehicle to travel to the dispatch location.

31. The system of claim 28, wherein the operating parameters comprise a home location.

32. The system of claim 31, wherein the software instructions further cause the processor to command the autonomous for-hire vehicle to travel to a home location.

33. The system of claim 27, wherein the software instructions further cause the processor to display a first status if the current operating state of the for-hire vehicle is compliant with the authorization rules and a second status if the current operating state of the for-hire vehicle is not compliant with the authorization rules.

34. The system of claim 27, wherein the software instructions further cause the processor to shut down the for-hire vehicle meter based at least in art on a result of the comparing.

35. The system of claim 27, wherein the software instructions further cause the processor to generate an alert message if the current operating state of the for-hire vehicle is not compliant with the authorization rules.

36. The system of claim 27, wherein the course of action is engaging passenger fares.

* * * * *